United States Patent [19]

Ikegami

[11] Patent Number: 5,475,510
[45] Date of Patent: Dec. 12, 1995

[54] METHOD FOR TRANSFORMING COLOR SIGNALS AND APPARATUS FOR THE METHOD

[75] Inventor: Hiroaki Ikegami, Kanagawa, Japan

[73] Assignee: Fuji Xerox Co., Ltd., Tokyo, Japan

[21] Appl. No.: 962,502

[22] Filed: Oct. 16, 1992

[30] Foreign Application Priority Data

Oct. 17, 1991 [JP] Japan .................................. 3-296659

[51] Int. Cl.$^6$ .................................................. H04N 1/46
[52] U.S. Cl. ........................ 358/525; 358/523; 358/530; 358/460
[58] Field of Search ..................... 358/515, 524, 358/525, 530, 443, 444, 445, 448, 455, 456, 458, 460, 523, 428

[56] References Cited

U.S. PATENT DOCUMENTS

| | | |
|---|---|---|
| 4,477,833 | 10/1984 | Clark et al. . |
| 4,758,885 | 7/1988 | Sasaki et al. . |
| 4,959,790 | 9/1990 | Morgan . |

FOREIGN PATENT DOCUMENTS

| | | |
|---|---|---|
| 58-16180 | 3/1983 | Japan . |
| 2-73779 | 3/1990 | Japan . |
| 2-187374 | 7/1990 | Japan . |
| 1369702 | 10/1974 | United Kingdom . |
| 1595122 | 8/1981 | United Kingdom . |
| 2104337 | 3/1983 | United Kingdom . |
| 0173032 | 3/1986 | United Kingdom . |
| 2217140 | 10/1989 | United Kingdom . |

OTHER PUBLICATIONS

"Digital Image Processing Application," Ying–wei Lin et al., SPIE–The International Society for Optical Engineering, vol. 10754, Jan. 17–20, 1989, pp. 26–31.

*Primary Examiner*—Bentsu Ro
*Attorney, Agent, or Firm*—Finnegan, Henderson, Farabow, Garrett & Dunner

[57] ABSTRACT

Method and apparatus for transforming color signals in order to reproduce a tone on an original document faithfully, and an apparatus for executing the method. The color signals transforming method comprises the steps of dividing each of three input signals representative of colors into the higher bits and the lower bits, combining the higher bits to form basic data, combining the higher and lower bits to form interpolation data, and adding the basic data and the interpolation data to each other, thereby forming output signals, in which the hexahedron of an object to be interpolated is divided into six tetrahedrons each passing through one of eight lattice points constituting the hexahedron of the interpolated object, and the different combinations of interpolation data are assigned to the tetrahedrons in one-to-one correspondence manner.

15 Claims, 13 Drawing Sheets

METHOD FOR TRANSFORMING COLOR SIGNALS AND APPARATUS FOR THE METHOD

BACKGROUND OF THE INVENTION

1. Field of the Invention

The present invention relates to a method for receiving and outputting signals representative of full color containing half-tone, which are used for a color scanner, color CRT, color printer, color copying machine, or the like, and an apparatus for executing the method. More particularly, the invention relates to a method for transforming color signals in order to reproduce a color faithfully, and an apparatus for executing the method.

2. Description of the Related Art

In the fields of color printing, color television, color copying machine and the like, there are many proposals to transform color signals. In a typical example of those proposals, an input color space, e.g., a BGR coordinate, is directly transformed into an output color space, e.g., a YMC (K) coordinate by using a table memory. When three color signals in a BGR coordinate, for example, are transformed into digital signals at resolutions of the necessary gray levels, a great amount of table data is required. To store the data, a table memory with a large memory capacity must be provided. Such a memory is very expensive.

For example, in a case where each of the input colors B, G, and R are expressed by 8 bits, and the output colors Y, M, C, and K are also expressed by 8 bits, the required memory capacity of the table memory is $2^{24} \times 4$ bytes. It is impractical to use such a big memory.

Many interpolation basis methods have been proposed for reducing the necessary memory capacity in transforming color signals by using the table memory. In these methods, a color correction memory addressed with the higher bits of the input signals is used for reducing the necessary memory capacity. The coarsened data is corrected by using an interpolation circuit using the lower bits.

The interpolation basis method disclosed in Published Examined Japanese Patent Application No. Sho. 58-16180 will be described with reference to FIG. 11 and with use of equation (1).

$$\begin{aligned} X'(x, y, z) = &\ X'(x_h, y_h, z_h)(1 - x_1) + \\ & X'(x_{h+1}, y_h, z_h)(x_1 - y_1) + \\ & X'(x_{h+1}, y_{h+1}, z_h)(y_1 - z_1) + \\ & X'(x_{h+1}, y_{h+1}, z_{h+1})z_1 \end{aligned} \quad (1)$$

FIG. 11 is an explanatory diagram showing the process to divide a unit cube. A unit cube as an object to be interpolated is divided, in three planes $x=y$, $y=z$, and $z=x$, into six tetrahedrons denoted as $\{1\}$ to $\{6\}$. The equation (11) is a mathematical expression of the interpolation for the tetrahedral region $\{2\}$. In the equation, $x_h$, $y_h$, and $z_h$ represent the higher bits of an input; $x_1$, $y_1$, and $z_1$, the lower bits of the same; $X'(x, y, z)$ indicates a value of one output in the input $(x, y, z)$.

In the interpolation method, the lower bits at a point to be interpolated are comparatively checked to determine which tetrahedron contains the interpolated point. The output values corresponding to the four vertexes of the tetrahedron containing the interpolated point are read out of a color correction memory, and are multiplied by four coefficients that are obtained by the subtraction of the lower bits, and the products are added together.

The above publication refers to the method of comparatively checking the lower bits, and the method of reading the output values corresponding to the four vertexes of the tetrahedron from the color correction memory, but does not refer to the details of the specific methods. However, the technique disclosed in the publication has the following problems as determined from the limited descriptions in the publication.

(1) An address calculation for the memory is complicated, when the output values corresponding to the four vertexes of the tetrahedron are read out of the color correction memory. When the hardware technique is used for the address calculation, the hardware construction is complicated. When the software technique is used for the same, much time is taken for processing the address calculation.

(2) Data must be regularly arranged in the color correction memory to allow the output values corresponding to the four vertexes of the tetrahedron to be read from the color correction memory. This technique is contradictory to the technique, proposed by the inventor of the present Patent Application (in Published Unexamined Japanese Patent Application No. Hei. 2-73779), in which the memory portion out of a color reproduction range of the output is removed by irregularly rearranging the regularly arranged data.

(3) As seen from the equation (1), a total number of required calculations is ten; three calculations for the lower bits, four calculations for multiplying the subtraction result by the outputs corresponding to the four vertexes of the tetrahedron, and three calculations for the final addition. A complicated hardware must be constructed for the calculations or much time must be taken for performing the calculations when the software is used for the calculations.

(4) When strictly considered, the dividing method of FIG. 11 has difficulty in handling data in the boundary face. For yf and zf, two comparisons must be made: yf>zf and yf≧zf.

To solve the problems (1) to (3), the inventor of the present Patent Application has proposed the interpolation method shown in FIG. 12 and mathematically expressed by an equation (2) in Published Unexamined Japanese Patent Application No. Hei. 2-187374.

$$\begin{aligned} X' = (x, y, z) = &\ X'(x_h, y_h, z_h) + a_x(x_h, y_h, z_h)x_1 + \\ & a_y(x_h, y_h, z_h)y_1 + a_z(x_h, y_h, z_h)z_1 = \\ & X'(x_h, y_h, z_h) + c(b_x(x_h, y_h, z_h), x_1) + \\ & c(b_y(x_h, y_h, z_h), y_1) + c(b_z(x_h, y_h, z_h), z_1) \end{aligned} \quad (2)$$

In the above equation, $X'(x_h, y_h, z_h)$ indicates a reference value of the output of a unit cube as an object to be interpolated.

$a_x(x_h, y_h, z_h)$, $a_y(x_h, y_h, z_h)$, and $a_z(x_h, y_h, z_h)$ represent interpolation sensitivity signals for the unit cube.

$b_x(x_h, y_h, z_h)$, $b_y(x_h, y_h, z_h)$, and $b_z(x_h, y_h, z_h)$ represent interpolation sensitivity select signals for the unit cube.

$c(b_x(x_h, y_h, z_h), x_1)$, $c(b_y(x_h, y_h, z_h), y_1)$, and $c(b_z(x_h, y_h, z_h), z_1)$ stand for interpolation values.

The interpolation method, as just mentioned, completes with only two steps, viz., one to make an access to the memory without any address calculation and the other to add together the readout data. The hardware to implement the method is simple in construction.

Further, the regular arrangement of data in the color correction memory is not essential. Accordingly, the technique is compatible with the technique (Published Unexamined Japanese Patent Application No. Hei. 2-73779) which removes the memory portion out of the color reproduction range of the output by rearranging the regularly arranged data into an irregular arrangement of data.

A modification of the FIG. 12 circuit that can readily be anticipated from the upper half of the equation (2) was also proposed. The modification is as illustrated in FIG. 13. A hardware to implement the modification that is constructed using the multipliers as in the case of FIG. 11, needs a total of only six calculations: three multiplications for each output and three additions for each output.

The deficiency common for the FIGS. 12 and 13 cases is that the boundary between the adjacent interpolation regions is discontinuous since a hexahedron including eight (8) vertexes, viz., an object to be interpolated of which freedom degree is eight (8) for each output color, is interpolated with four parameters X' $(x_h, y_h, z_h)$, and $a_h$ $(x_h, y_h, z_h)$, $a_y$ $(x_h, y_h, z_h)$ and $a_z$ $(x_h, y_h, z_h)$. Reduction of the interpolated regions, viz., increase of the higher bits, will apparently secure the continuity at the boundaries. However, the increase of the higher bits results in an increased memory capacity.

SUMMARY OF THE INVENTION

In view of the described background, the present invention has an object to provide a method for transforming color signals and an apparatus for executing the method, which have the following advantageous features:

(1) Complicated address conversion is not required when the memory is accessed. High speed processing is possible with a simple circuit arrangement.

(2) The regular arrangement in the color correction memory is not essential. The technique of the invention is compatible with the above-mentioned technique, which removes the memory portion out of the color reproduction regions by arranging irregular the data that are regularly arranged in the memory (Published Unexamined Japanese Patent Application Nos. Hei. 2-73779 and 2-187374).

(3) The number of calculations for each output is reduced to be as small as possible. Accordingly, a high speed processing is realized with a simple circuit construction.

(4) Continuity at the boundary region is secured.

(5) The data at the boundary surfaces when the division/interpolation is carried out is accurately handled, thereby eliminating unnecessary comparing operations.

A method is provided for transforming color signals in which three input signals representative of colors are each divided into the higher bits and the lower bits, the higher bits are combined to form basic data, the lower bits are combined to form interpolation data, and the basic data and the interpolation data are added to each other, thereby forming output signals, and in which the hexahedron of an object to be interpolated is divided into six tetrahedrons each passing through one of eight lattice points constituting the hexahedron of the interpolated object, and the different combinations of interpolation data are assigned to the tetrahedrons in one-to-one correspondence manner.

$$\begin{aligned}
X'(x, y, z) &= X'(x_h, y_h, z_h) + \\
&\quad a_x(x_h, y_h, z_h, d_x(x_1, y_1, z_1))x_1 + \\
&\quad a_y(x_h, y_h, z_h, d_y(x_1, y_1, z_1))y_1 + \\
&\quad a_z(x_h, y_h, z_h, d_z(x_1, y_1, z_1))z_1 \\
&= X'(x_h, y_h, z_h) + \\
&\quad c(b_x(x_h, y_h, z_h, d_x(x_1, y_1, z_1)), x_1) + \\
&\quad c(b_y(x_h, y_h, z_h, d_y(x_1, y_1, z_1)), y_1) + \\
&\quad c(b_z(x_h, y_h, z_h, d_z(x_1, y_1, z_1)), z_1) \\
&= X'(x_h, y_h, z_h) + \\
&\quad c(x_h, y_h, z_h, d_x(x_1, y_1, z_1), x_1) + \\
&\quad c(x_h, y_h, z_h, d_y(x_1, y_1, z_1), y_1) + \\
&\quad c(x_h, y_h, z_h, d_z(x_1, y_1, z_1), z_1) \\
&= X'(x_h, y_h, z_h) + \\
&\quad a_x(e_{i,i=1,7}(x_h, y_h, z_h), d_x(x_1, y_1, z_1))x_1 + \\
&\quad a_y(e_{i,i=1,7}(x_h, y_h, z_h), d_y(x_1, y_1, z_1))y_1 + \\
&\quad a_z(e_{i,i=1,7}(x_h, y_h, z_h), d_z(x_1, y_1, z_1))z_1 \\
&= X'(x_h, y_h, z_h) + \\
&\quad c(b_x(e_{i,i=1,7}(x_h, y_h, z_h), d_x(x_1, y_1, z_1)), x_1) + \\
&\quad c(b_y(e_{i,i=1,7}(x_h, y_h, z_h), d_y(x_1, y_1, z_1)), y_1) + \\
&\quad c(b_z(e_{i,i=1,7}(x_h, y_h, z_h), d_z(x_1, y_1, z_1))z_1)
\end{aligned} \quad (3)$$

In the above equation, X' $(x_h, y_h, z_h)$ represents basic data as the combination of the higher bits.

$a_x(x_h, y_h, z_h, d_x(x_1, y_1, z_1))$, $a_y(x_h, y_h, z_h, d_y(x_1, y_1, z_1))$, $a_z(x_h, y_h, z_h, d_z(x_1, y_1, z_1))$, $a_x(e_{i,i=1,7}(x_h, y_h, z_h), d_x(x_1, y_1, z_1))$, $a_y(e_{i,i=1,7}(x_h, y_h, z_h), d_y(x_1, y_1, z_1))$, and $a_z(e_{i,i=1,7}(x_h, y_h, z_h), d_z(x_1, y_1, z_1))$ represent interpolation sensitivity signals.

$b_x(x_h, y_h, z_h, d_x(x_1, y_1, z_1))$, $c(b_y(x_h, y_h, z_h, d_y(x_1, y_1, z_1))$, $c(b_z(x_h, y_h, z_h, d_z(x_1, y_1, z_1))$, $b_x(e_{i,i=1,7}(x_h, y_h, z_h), d_x(x_1, y_1, z_1))$, $b_y(e_{i,i=1,7}(x_h, y_h, z_h), d_y(x_1, y_1, z_1))$, and $b_z(e_{i,i=1,7}(x_h, y_h, z_h), d_z(x_1, y_1, z_1))$ represent interpolation sensitivity select signals.

$c(b_x(x_h, y_h, z_h, d_x(x_1, y_1, z_1)), x_1)$, $c(b_y(x_h, y_h, z_h, d_y(x_1, y_1, z_1)), y_1)$, $c(b_z(x_h, y_h, z_h, d_z(x_1, y_1, z_1)), z_1)$, $c(x_h, y_h, z_h, d_x(x_1, y_1, z_1), x_1)$, $c(x_h, y_h, z_h, d_y(x_1, y_1, z_1), y_1)$, $c(x_h, y_h, z_h, d_z(x_1, y_1, z_1), z_1)$, $c(b_x(e_{i,i=1,7}(x_h, y_h, z_h), d_x(x_1, y_1, z_1)), x_1)$, $c(b_y(e_{i,i=1,7}(x_h, y_h, z_h), d_y(x_1, y_1, z_1)), y_1)$, and $c(b_z(e_{i,i=1,7}(x_h, y_h, z_h), d_z(x_1, y_1, z_1)), z_1)$ represent interpolation data.

$d_x$ $(x_1, y_1, z_1)$, $d_y$ $(x_1, y_1, z_1)$, and $d_z$ $((x_1, y_1, z_1)$ are interpolation region select signals as the combinations of the lower bits.

$e_{i,i=1,7}$ $(x_h, y_h, z_h)$ indicates difference data corresponding to seven lattice points as the remaining lattice points when one of the eight lattice points of each of the hexadrons of the interpolated regions as the combinations of the higher bits, is a reference point.

Specific examples of the dividing method are shown in FIGS. 1 and 2. Interpolation sensitivity signals $a_x$, $a_y$, and $a_z$ in the dividing methods are shown in Tables 1 and 2.

In FIGS. 1 and 2, the hexadrons of the interpolated objects are illustrated as cubes; however, those may be cuboids of which the sides are different, or modified hexahedrons in the case of the inputs expressed in the polar coordinates.

TABLE 1

| | Unit Hexadron Dividing Method 1 | | | | | |
|---|---|---|---|---|---|---|
| Region No. | $x_1 >= y_1$ | $y_1 > z_1$ | $z_1 > x_1$ | $z_1 > x_1$ $x_1 >= y_1$ | $x_1 >= y_1$ $y_1 > z_1$ | $y_1 > z_1$ $z_1 > x_1$ |
| {1} | (1) | 0 | 0 | 01 | 10 | 00 |

TABLE 1-continued

Unit Hexadron Dividing Method 1

| | | | | | | |
|---|---|---|---|---|---|---|
| {2} | 1 | 1 | (0) | same as {1} | 11 | 10 |
| {3} | 1 | (0) | 1 | 11 | same as {1} | 01 |
| {4} | 0 | 0 | (1) | 10 | 00 | same as {3} |
| {5} | 0 | {1} | 0 | 00 | 01 | same as {2} |
| {6} | (0) | 1 | 1 | same as {4} | same as {5} | 11 |

| Region No. | $a_x \cdot x_{hl}$ | $a_y \cdot y_{hl}$ | $a_z \cdot z_{hl}$ |
|---|---|---|---|
| {1} | $X'(x_{h+1},y_h,z_h) - X'(x_h,y_h,z_h)$ | $X'(x_{h+1},y_{h+1},z_h)$ | $X'(x_{h+1},y_h,z_{h+1}) - X'(x_{h+1},y_h,z_h)$ |
| {2} | same as {1} | $X'(x_{h+1},y_{h+1},z_h) - X'(x_{h+1},y_h,z_h)$ | $X'(x_{h+1},y_{h+1},z_{h+1})$ |
| {3} | $X'(x_{h+1},y_h,z_{h+1}) - X'(x_h,y_h,z_{h+1})$ | same as {1} | $X'(x_h,y_h,z_{h+1}) - X'(x_h,y_h,z_h)$ |
| {4} | $X'(x_{h+1},y_{h+1},z_{h+1})$ | $X'(x_h,y_{h+1},z_{h+1}) - X'(x_h,y_h,z_{h+1})$ | same as {3} |
| {5} | $X'(x_{h+1},y_{h+1},z_h) - X'(x_h,y_{h+1},z_h)$ | $X'(x_h,y_{h+1},z_h) - X'(x_h,y_h,z_h)$ | same as {2} |
| {6} | same as {4} | same as {5} | $X'(x_h,y_{h+1},z_{h+1}) - X'(x_h,y_{h+1},z_h)$ |

$x_{hl}$, $y_{hl}$, and $z_{hl}$: Unit length of the object regions to be interpolated

TABLE 2

Unit Hexadron Dividing Method 2

| Region No. | $x_1 >= y_1$ | $y_1 >= z_1$ | $z_1 >= x_1$ | $x_1 - y_1 - z_1 >= 0$ | $x_1 - y_1 + z_1 >= 0$ | $x_1 >= y_1$<br>$y_1 >= z_1$<br>$z_1 => x_1$<br>$x_1 - y_1 -$<br>$z_1 >= 0$<br>$x_1 - y_1 + z_1 >= 0$ | $y_1 >= z_1$<br>$z_1 >= x_1$ |
|---|---|---|---|---|---|---|---|
| {1} | (1) | (_) | (0) | 1 | (1) | 1-011 | 00 |
| {2} | 1 | (_) | 0 | 0 | (1) | 1-001 | 10 |
| {3} | 1 | (0) | 1 | (0) | (1) | 1-101 | 01 |
| {4} | 0 | 0 | (1) | (0) | (1) | 00-01 | same as {3} |
| {5} | 0 | 1 | (_) | (0) | 1 | 01-01 | same as {2} |
| {6} | (0) | (1) | (_) | (0) | 0 | 01-00 | 11 |

| Region No. | $a_x \cdot x_{hl}$ | $a_y \cdot y_{hl}$ | $a_z \cdot z_{hl}$ |
|---|---|---|---|
| {1} | $X'(x_{h+1},y_h,z_h) - X'(x_h,y_h,z_h)$ | $X'(x_{h+1},y_{h+1},z_h) - X'(x_{h+1},y_h,z_h)$ | $X'(x_{h+1},y_h,z_{h+1}) - X'(x_{h+1},y_h,z_h)$ |
| {2} | $X'(x_{h+1},y_{h+1},z_h) - X'(x_h,y_h,z_h) - X'(x_{h+1},y_{h+1},z_{h+1}) + X'(x_{h+1},y_h,z_{h+1})$ | $X'(x_{h+1},y_{h+1},z_{h+1}) - X'(x_{h+1},y_h,z_{h+1})$ | $X'(x_{h+1},y_{h+1},z_{h+1}) - X'(x_{h+1},y_{h+1},z_h)$ |
| {3} | $X'(x_{h+1},y_h,z_{h+1}) - X'(x_h,y_h,z_{h+1})$ | same as {2} | $X'(x_h,y_h,z_{h+1}) - X'(x_h,y_h,z_h)$ |
| {4} | $X'(x_{h+1},y_{h+1},z_{h+1}) - X'(x_h,y_{h+1},z_{h+1})$ | $X'(x_h,y_{h+1},z_{h+1}) - X'(x_h,y_h,z_{h+1})$ | same as {3} |
| {5} | same as {4} | $X'(x_{h+1},y_{h+1},z_h) - X'(x_h,y_h,z_h) - X'(x_{h+1},y_{h+1},z_{h+1}) + X'(x_h,y_{h+1},z_{h+1})$ | same as {2} |
| {6} | $X'(x_{h+1},y_{h+1},z_h) - X'(x_h,y_{h+1},z_h)$ | $X'(x_h,y_{h+1},z_h) - X'(x_h,y_h,z_h)$ | $X'(x_h,y_{h+1},z_{h+1}) - X'(x_h,y_{h+1},z_h)$ |

$x_{hl}$, $y_{hl}$, and $z_{hl}$: Unit length of the object regions to be interpolated.

An apparatus for executing the color signal transforming method having three input signals (L*, a*, b*) representative of colors being each divided into the lower bits and the higher bits which are combined to form address signals, a color correction memory (1 in FIGS. 1 through 10), when receiving the address signals, for producing basic data, interpolation data generating means (5, 6, and 7 in FIG. 3, 5, 6, and 8 in FIG. 4; 2, 4, and 8 in FIG. 6; 2 and 8 in FIG.

7; 6, 8, 9, 10, and 11 in FIG. 8; 2, 8, 9, 10, 11, and 12 in FIG. 9) for generating the combinations of interpolation data in accordance with the combinations of the higher bits and the lower bits, and adder means (3 in FIGS. 3 through 10) for adding the output signal of the color correction memory and the output signal of the interpolation data generating means, thereby to produce an output signal. In the color signal transforming apparatus, the interpolation data generating means includes means (5 and 7 in FIG. 3; 5 and 8 in FIG. 4; 4 and 7 in FIG. 5; 4 and 8 in FIG. 6; 8 in FIG. 7; 8, 9, 10, and 11 in FIG. 8; 2, 8, 9, 10, 11, and 12 in FIG. 9) for dividing the hexahedron of an object to be interpolated into six tetrahedrons each passing through one of eight lattice points constituting the hexahedron of the interpolated object, and for assigning the different combinations of interpolation data to the tetrahedrons in one-to-one correspondence manner.

In the color signal transforming apparatus constructed as just mentioned, the interpolation data generating means includes interpolation region select memory means (7 in FIG. 3; 7 in FIG. 5; 7 and FIG. 10) for outputing a plurality of interpolation region select signals that are fit to the commonness of the interpolation sensitivity signals, with the combination of the lower bits as an address signal, to specify to which of the six tetrahedrons each the input signal belongs.

The interpolation region select signals correspond to $d_x (x_1, y_1, z_1)$, $d_y (x_1, y_1, z_1)$, and $d_z ((x_1, y_1, z_1)$ in the equation (3), and to the signals represented by $[z_1 > x_1, x_1 \geq y_1]$, $[x_1 \geq y_1, y_1 \geq z_1]$, $[y_1 > z_1, z_1 > x_1]$, $[x_1 \geq y_1, y_1 \geq z_1]$, $z_1 \geq x_1$, $x_1 - y_1 - z_1 \geq 0$, $x_1 - y_1 + z_1 \geq 0$ ] in Tables 1 and 2.

As seen from Tables 1 and 2, the interpolation sensitivity signals $a_x$, $a_y$, and $a_z$ of the six tetrahedrons are different from one another, but when observing individually the elements of the signals $a_x$, $a_y$, and $a_z$, the elements have something in common with one another. The interpolation region select signals are set so as to be fit to the commonality.

In the color signal transforming apparatus, the interpolation data generating means may include, in place of the interpolation region select memory means, a plurality of comparators (8 in FIGS. 4, 6, 7, 8, and 9) for comparing the lower bits of the three input signals, some shifted lower bits of the three input signals, or the results of the addition/subtraction of them, and means for producing the combinations of the output signals of the comparators in the form of a plurality of interpolation region select signals that are fit to the commonness of the interpolation sensitivity signals.

The color signal transforming apparatus as just mentioned calculates interpolation region select signals by using the comparators, for example, instead of causing the memory to produce those signals. Why the circuit arrangements of FIGS. 1 and 2 are different will be seen from the interpolation region select signals in Tables 1 and 2.

Where the numbers of the lower bits of the three input signals are different, these are ordered in their places by shift registers before input to the comparators.

The interpolation data generating means may include interpolation sensitivity output memory means (5 in FIGS. 3, 4, and 10) for producing a plurality of interpolation sensitivity signals in response to address signals consisting of the combination of the higher bits of the three input color signals and some of the interpolation region select signals, and a plurality of interpolation data calculating means (6 in FIGS. 3, 4, and 10) for producing interpolation data by multiplying one of the output signals of the interpolation sensitivity output memory means by the lower bit of one of the three input color signals.

The plurality of interpolation sensitivity output signals correspond to $a_x (x_h, y_h, z_h, d_x (x_1, y_1, z_1))$, $a_y (x_h, y_h, z_h, d_z (x_1, y_1, z_1))$, and $a_z (x_h, y_h, z_h, d_z (x_1, y_1, z_1))$ in the equation (3).

Instead of the interpolation sensitivity output memory means and the plurality of interpolation data calculating means, the interpolation data generating means may include interpolation sensitivity select output memory means (4 in FIGS. 5 and 6) for producing a plurality of interpolation sensitivity signals in response to address signals consisting of the combination of the higher bits of the three input color signals and some of the interpolation region select signals, and a plurality of interpolation data output memory means (2 in FIG. 5; 6 in FIG. 6) for producing interpolation data in response to an address signal including one of the output signals of the interpolation sensitivity select output memory means and the lower bit of one of the three input color signals.

The plurality of interpolation sensitivity select output signals correspond to $b_x (x_h, y_h, z_h, d_x (x_1, y_1, z_1))$, $b_y (x_h, y_h, z_h, d_y (x_1, y_1, z_1))$, and $b_z (x_h, y_h, z_h, d_z (x_1, y_1, z_1))$ in the equation (3).

The interpolation data output signals correspond to $c(b_x (x_h, y_h, z_h, d_x(x_1, y_1, z_1)), x_1)$, $c(b_y (x_h, y_h, z_h, d_y(x_1, y_1, z_1)), y_1)$ and $c(b_z (x_h, y_h, z_h, d_z(x_1, y_1, z_1))$ in the equation (3).

In this case, the memory is used in place of the multiplying operation. Accordingly, there is no need of using the interpolation intensities per se. Interpolation sensitivity select output signals to specify the memory addresses where the corresponding interpolation intensities are stored.

In the color signal transforming apparatus, the interpolation data generating means may include, instead of the interpolation sensitivity output memory means and the interpolation data calculating means for multiplying operation, a plurality of interpolation data output memory means (7 in FIG. 7) for producing interpolation data in response to address signals consisting of the combination of the higher bits of the three input color signals and some of the interpolation region select signals, and the lower bit of one of the three input color signals.

The interpolation data output signals correspond to $c (x_h, y_h, z_h, d_x(x_1, y_1, z_1), x_1)$, $c(x_h, y_h, z_h, d_y(x_1, y_1, z_1), y_1)$, $c(x_h, y_h, z_h, d_z(x_1, y_1, z_1), z_1)$ in the equation (3).

Instead of the interpolation sensitivity output memory means, the interpolation data generating means includes interpolation sensitivity output means containing a memory portion (9 in FIG. 8) for producing difference data corresponding to seven lattice points as the remaining lattice points when one of the eight lattice points of each of the hexadrons of the interpolated regions as the combinations of the higher bits is a reference point in response to an address signal as the combination of the higher bits of the three input color signals, a plurality of subtractor portions (10 in FIG. 8) for calculating the difference between the difference data, and a portion (11 in FIG. 8) for selecting a plurality of proper interpolation sensitivity output signals from among the difference data or the subtraction results by using some of the interpolation region select signals; and a plurality of interpolation data output means (6 in FIG. 8) for outputing output data by multiplying one of the output signals of the interpolation sensitivity output means by the lower bit of one of the three input signals.

The difference data corresponding to seven lattice points as the remaining lattice points when one of the eight lattice points of each of the hexadrons of the interpolated regions is a reference point corresponds to $e_{i,i=1,7}$ ($x_h$, $y_h$, $z_h$) in the equation (3). The interpolation sensitivity output signals correspond to $a_x$ ($e_{i,i=1,7}$ ($x_h$, $y_h$, $z_h$), $d_x$ ($x_h$, $y_h$, $z_h$)), $a_y$ ($e_{i,i=1,7}$ ($x_h$, $y_h$, $z_h$), $d_y$ ($x_h$, $y_h$, $z_h$)), and $a_z$ ($e_{i,i=1,7}$ ($x_h$, $y_h$, $z_h$), $d_z$ ($x_h$, $y_h$, $z_h$)).

Instead of the interpolation sensitivity select output memory means, the interpolation data generating means includes interpolation sensitivity select output means containing a memory portion (9 in FIG. 9) for producing difference data corresponding to seven lattice points as the remaining lattice points when one of the eight lattice points of each of the hexadrons of the interpolated regions as the combinations of the higher bits is a reference point in response to an address signal as the combination of the higher bits of the three input color signals, calculating portions (10 in FIG. 9) for forming interpolation sensitivity select output signals from the difference data, portions (11 in FIG. 9) for selecting a plurality of proper interpolation sensitivity output signals from among the difference data or the subtraction results by using some of the interpolation region select signals, and portions (12 in FIG. 9) for transforming the plurality of selected interpolation sensitivity output signals into a plurality of interpolation sensitivity select signals; and a plurality of interpolation data output means (2 in FIG. 9) for outputting interpolation data in response to an address signal containing one of the output signals of the interpolation sensitivity select output means and the lower bit of one of the three input signals.

The interpolation sensitivity select output signals correspond to $b_x$ ($e_{i,i=1,7}$ ($x_h$, $y_h$, $z_h$), $d_x$ ($x_h$, $y_h$, $z_h$)), $b_y$ ($e_{i,i=1,7}$ ($x_h$, $y_h$, $z_h$), $d_y$ ($x_h$, $y_h$, $z_h$)), and $b_z$ ($e_{i,i=1,7}$ ($x_h$, $y_h$, $z_h$), $d_z$ ($x_h$, $y_h$, $z_h$)) in the equation (3). The interpolation output signals correspond to c ($b_x$ ($e_{i,i=1,7}$ ($x_h$, $y_h$, $z_h$), $d_x$ ($x_1$, $y_1$, $z_1$)), $x_1$), c ($b_y$ ($e_{i,i=1,7}$ ($x_h$, $y_h$, $z_h$), $d_y$ ($x_1$, $y_1$, $z_1$)), $y_1$, and c ($b_z$ ($e_{i,i=1,7}$ ($x_h$, $y_h$, $z_h$), $d_z$ ($x_1$, $y_1$, $z_1$)), $z_1$) in the equation (3).

A color signal transforming apparatus comprises a start address/lower bit generating memory (13 in FIG. 10), when receiving an address signal containing two of three input signals representative of a first colorimetric coordinate, for producing a start address previously set in consideration of a color reproduction range of an output device and the modified lower bits of the two input signals; maximum/minimum generating means (14 in FIG. 10), when receiving an address signal containing two of the three input signals, for generating the maximum and minimum values of the remaining one input signal in consideration of the color reproduction range of the output; calculating means (16 and 17 in FIG. 10) for modifying the remaining one input signal using the maximum and minimum values output from the maximum/minimum generating means; an address adder (15 in FIG. 10) for adding the start address output from the start address/lower bit generating memory and the higher bit of a fixed number of the remaining one input signal; a basic data color correction memory (1 in FIG. 10) for producing basic data signals representative of colors of a second colorimetric coordinate in response to an address signal as the output signal of the address adder; interpolation data generating means (7, 5, and 6 in FIG. 10) for generating a set of interpolation data on the basis of the combination of the higher bits output from the address adder and the combination of the modified lower bits of the input signals; adder means (3 in FIG. 10) for producing output signals representative of colors of the second colorimetric coordinate by adding the output signal of the basic data color correction memory and the output signal of the interpolation data generating means; and the interpolation data generating means including means (7 and 5 in FIG. 10) for dividing the hexahedron of each object to be interpolated into six tetrahedrons each passing through one of eight lattice points constituting the hexahedron of the interpolated object, and for assigning different combinations of interpolation data to the tetrahedrons in one-to-one correspondence manner.

In the present invention, three input signals representative of colors are each divided into the higher bits and the lower bits. The color correction memory for basic data is addressed with the combination of the higher bits, so that it produces basic data corresponding to X' ($x_h$, $y_h$, $z_h$) in the equation (3).

The combination of the higher bits is input as an address signal to the memory means for interpolation region select or is input to the interpolation region select signal output means including comparators, for example, which in turn produces a plurality of interpolation region select signals corresponding to $d_x$ ($x_1$, $y_1$, $z_1$), $d_y$ ($x_1$, $y_1$, $z_1$), and $d_z$ ($x_1$, $y_1$, $z_1$) in the equation (3).

The combination of the higher bits of the input signals and some of the interpolation region select signals are input to the interpolation sensitivity output memory means, the interpolation sensitivity select output means, interpolation sensitivity output means, or interpolation sensitivity select output means, so that a plurality of interpolation sensitivity signals corresponding to $a_x$ ($x_h$, $y_h$, $z_h$, $d_x$ ($x_1$, $y_1$, $z_1$)), $a_y$ ($x_h$, $y_h$, $z_h$, $d_z$ ($x_1$, $y_1$, $z_1$)), and $a_z$ ($x_h$, $y_h$, $z_h$, $d_z$ ($x_1$, $y_1$, $z_1$)) or $a_x$ ($e_{i,i=1,7}$ ($x_h$, $y_h$, $z_h$), $d_x$ ($x_1$, $y_1$, $z_1$)), $a_y$ ($e_{i,i=1,7}$ ($x_h$, $y_h$, $z_h$), $d_y$ ($x_1$, $y_1$, $z_1$)), and $a_z$ ($e_{i,i=1,7}$ ($x_h$, $y_h$, $z_h$), $d_z$ ($x_1$, $y_1$, $z_1$)) in the equation (3) or a plurality of interpolation sensitivity select signals corresponding to $b_x$ ($x_h$, $y_h$, $z_h$, $d_x$ ($x_1$, $y_1$, $z_1$)), $b_y$ ($x_h$, $y_h$, $z_h$, $d_y$ ($x_1$, $y_1$, $z_1$)), $b_z$ ($x_h$, $y_h$, $z_h$, $d_z$ ($x_1$, $y_1$, $z_1$)) or $b_x$ ($e_{i,i=1,7}$ ($x_h$, $y_h$, $z_h$), $d_x$ ($x_1$, $y_1$, $z_1$)), $b_y$ ($e_{i,i=1,7}$ ($x_h$, $y_h$, $z_h$), $d_y$ ($x_1$, $y_1$, $z_1$)), $b_z$ ($e_{i,i=1,7}$ ($x_h$, $y_h$, $z_h$), $d_z$ ($x_1$, $y_1$, $z_1$)) in the equation (3) are output.

Each of the plurality of interpolation sensitivity output signals is multiplied by one of the lower bits of the input signal or each interpolation sensitivity select output signal and the lower bits of the input signal are input as address signals to the plurality of interpolation data output memory means, so that plural interpolation data corresponding to c($b_x$ ($x_h$, $y_h$, $z_h$, $d_x$ ($x_1$, $y_1$, $z_1$)), $x_1$), c($b_y$ ($x_h$, $y_h$, $z_h$, $d_y$ ($x_1$, $y_1$, $z_1$)), $y_1$), c($b_z$ ($x_h$, $y_h$, $z_h$, $d_z$ ($x_1$, $y_1$, $z_1$)), $z_1$), or c($b_x$ ($e_{i,i=1,7}$ ($x_h$, $y_h$, $z_h$), $d_x$ ($x_1$, $y_1$, $z_1$)), $x_1$), c($b_y$ ($e_{i,i=1,7}$ ($x_h$, $y_h$, $z_h$), $d_y$ ($x_1$, $y_1$, $z_1$)), $y_1$), c($b_z$ ($e_{i,i=1,7}$ ($x_h$, $y_h$, $z_h$), $d_z$ ($x_1$, $y_1$, $z_1$)), $z_1$) in the equation (3) are output.

The combination of the higher bits of the input signals and the interpolation region select signals, the lower bits of the input signal are input as address signals to the plurality of interpolation data output memory means, so that plural interpolation data corresponding to c(($x_h$, $y_h$, $z_h$), $d_x$ ($x_1$, $y_1$, $z_1$)), $x_1$), c($x_h$, $y_h$, $z_h$, $d_y$ ($x_1$, $y_1$, $z_1$)), $y_1$), c($x_h$, $y_h$, $z_h$, $d_z$ ($x_1$, $y_1$, $z_1$)), $z_1$) in the equation (3) are output.

Finally, the basic data is added to the plural interpolation data, so that an interpolated value corresponding to X' (x, y, z) is output.

In addition to the arrangement of the color signal transforming apparatus including the interpolation data generating means, the color signal transforming apparatus of the invention may take the arrangement including the start address/lower bit generating memory and the address adder. The latter arrangement of the apparatus has the advantageous effects comparable with those of the former arrangement. Further, the start address can be previously set so as to efficiently use the color correction memories while considering the color reproduction ranges (of the colors in the colorimetric coordinate) of the output device. With this feature, the memory capacity of each color correction memory can be further saved, and the resultant color signal transforming apparatus is operable at high speed.

BRIEF DESCRIPTION OF THE DRAWINGS

The accompanying drawings, which are incorporated in and constitute a part of the spcification, illustrated presently preferred embodiments of the invention and, together with the general description given above and the detailed description of the preferred embodiments given below, serve to explain the principles of the invention. In the accompanying drawings.

DESCRIPTION OF THE PREFERRED EMBODIMENTS

The preferred embodiments of the invention will be described with reference to FIG. 3 and the subsequent figures.

In those figures, for ease of explanation, input color signals L*, a*, and b* consist of 7 bits, 8 bits, and 8 bits, respectively. The lower bits of each input color signal are n bits. Output color signals Y%, M%, and C% (K%) are each expressed by 8 bits. It is evident, however, that the kinds of the input and output color signals and the numbers of bits forming these color signals are not limited to those illustrated.

A circuit arrangement for only one kind of output signal is illustrated, for simplicity. If required, the invention is applicable for plural kinds of output signals.

Where the circuit is arranged so as to handle plural kinds of output signals, the hardware component that can be used common to the plural kinds of output signals, such as interpolation region select signal output memory means or the interpolation region select signal output means, may be used as a common hardware component. Alternatively, those components may be constructed independently where it is desired to provide the signal processing routes respectively for those different kinds of output signals.

Figure 3:
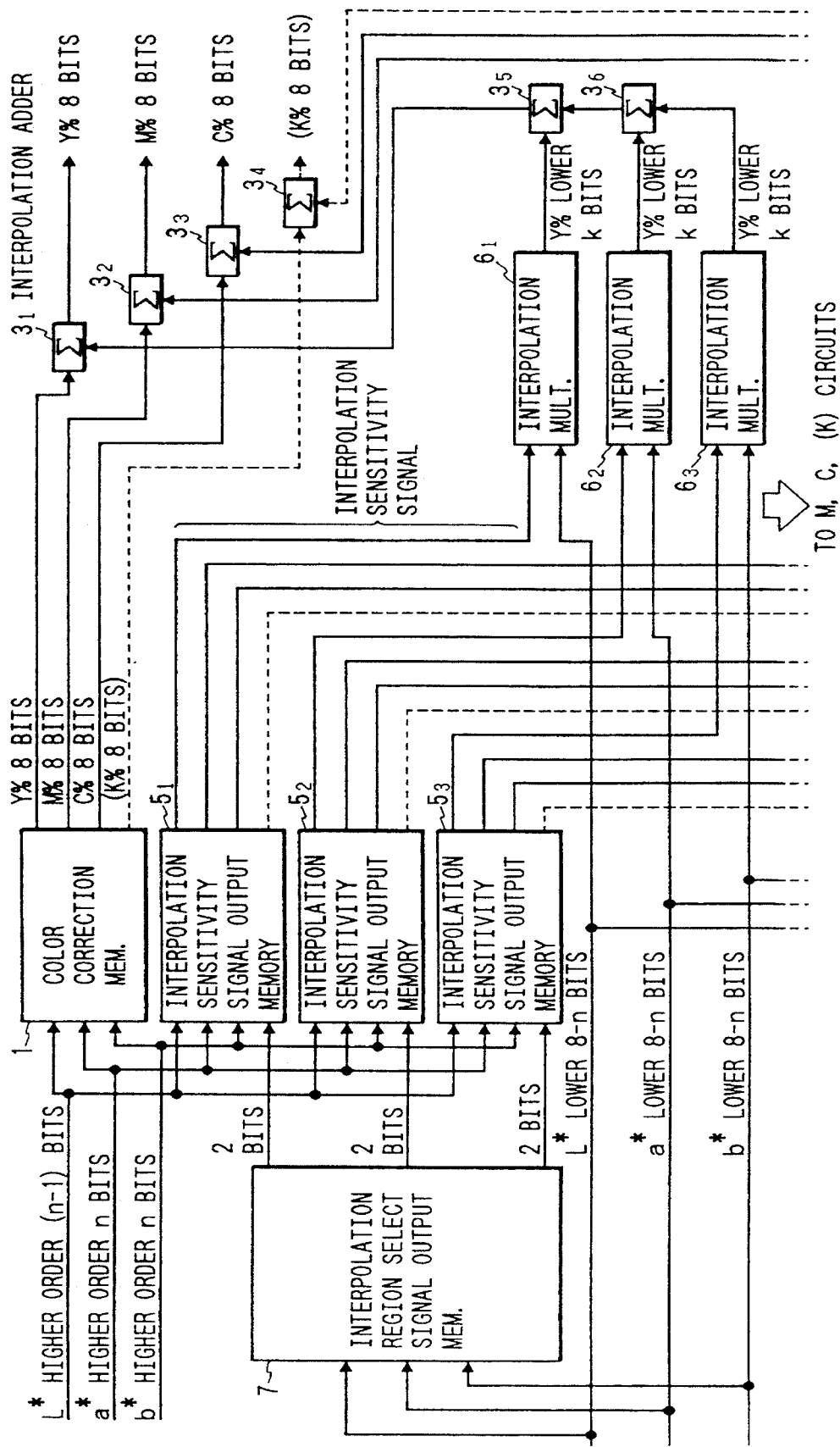
FIG. 3 is a block diagram showing a color signal transforming circuit according to a first embodiment of the present invention.

The arrangement of a first embodiment of the invention is illustrated in FIG. 3.

The first embodiment is made up of a color correction memory 1 for basic data, an interpolation region select signal output memory 7, interpolation sensitivity signal output memories $5_1$ to $5_3$, interpolation multipliers $6_1$ to $6_3$, and interpolation adders $3_1$ to $3_3$.

The basic data color correction memory 1 is a lookup table memory which receives an address signal consisting of the higher bits of the input color signals L*, a*, and b*, and produces correction reference values corresponding to X' $(x_h, y_h, z_h)$ in the equation (3).

The interpolation region select signal output memory 7 is also a lookup table memory which receives an address signal consisting of the lower bits of the input color signals L*, a*, and b*, and produces interpolation region select signals.

As already described, the interpolation region select signals output from the interpolation region select signal output memory 7 correspond to $d_x (x_1, y_1, z_1)$, $d_y (x_1, y_1, z_1)$, and $d_z ((x_1, y_1, z_1)$ in the equation (3), and to the signals represented by $[z_1 > x_1, x_1 \geq y_1]$, $[x_1 \geq y_1, y_1 > z_1]$, $[y_1 > z_1, z_1 > x_1], [x_1 \geq y_1, y_1 \geq z_1, z_1 \geq x_1, x_1 - y_1 + z_1 \geq 0]$ in Tables 1 and 2. As seen from Tables 1 and 2, the interpolation sensitivity signals $a_x$, $a_y$, and $a_z$ of the six tetrahedrons are different from one another, but when observing individually the elements of the signals $a_x$, $a_y$, and $a_z$, the elements having something in common with one another. The interpolation region select signals are set so as to be fit to the commonness.

Figure 1:
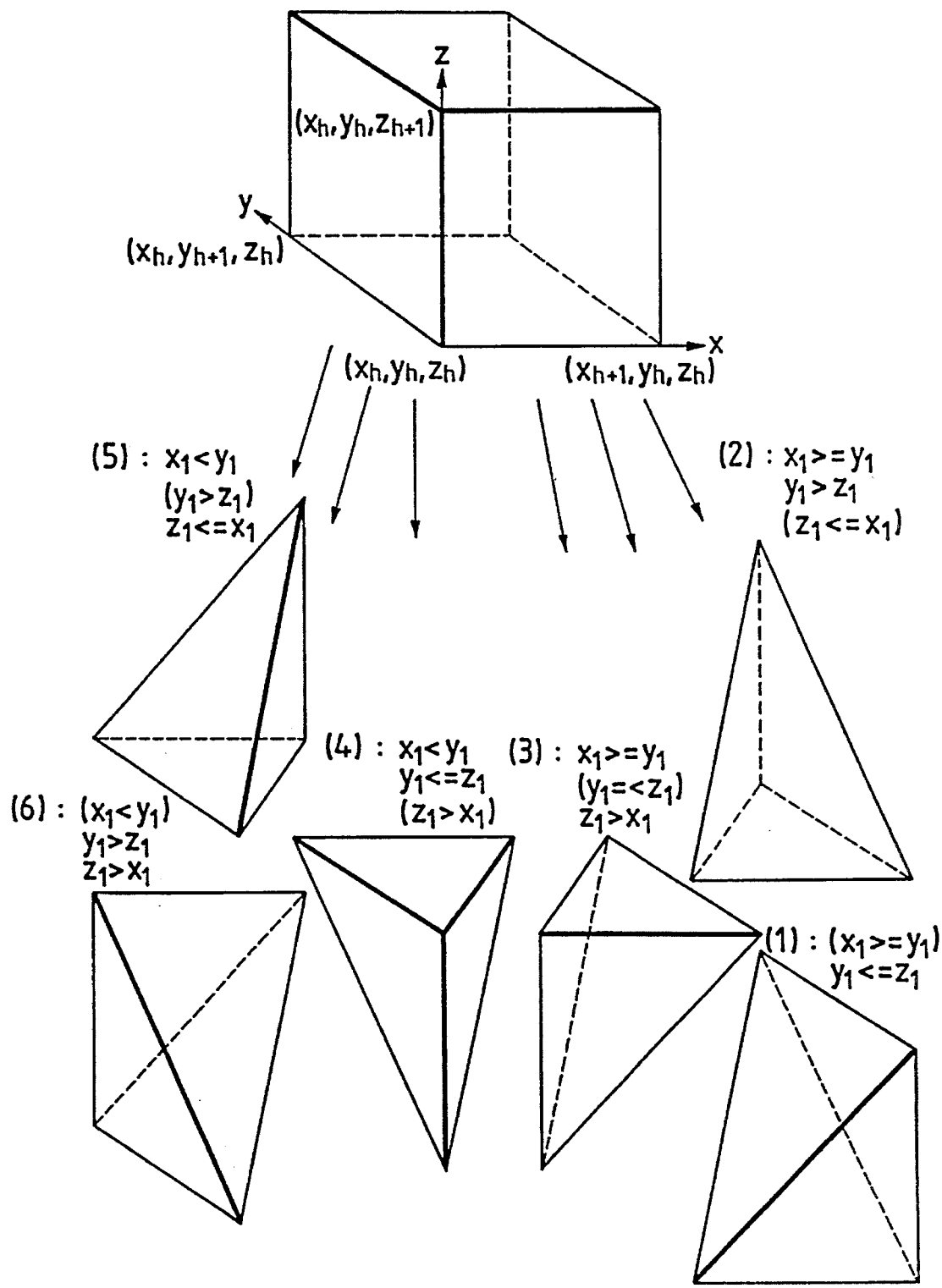
FIG. 1 is an explanatory diagram showing a first method for dividing a unit hexadron according to the present invention.

In FIG. 3, the output consists of three ways each of 2 bits, with relation to the dividing method shown in FIG. 1 and Table 1. For the dividing method shown in FIG. 2 and Table 2, the output consists of two ways, one way of 4 bits and the other way of 2 bits, as readily seen from Table 2. In FIG. 3, the input signals have the same in the number of the lower bits, but these signals may have different numbers of the lower bits.

The interpolation sensitivity signal output memories $5_1$ to $5_3$ are lookup table memories each of which receives an address signal containing the higher bits of the input color signals L*, a*, and b* and the interpolation region select signal, and produces a plurality of interpolation sensitivity signals corresponding to $a_x (x_h, y_h, z_h, d_x (x_1, y_1, z_1))$, $a_y (x_h, y_h, z_h, d_y (x_1, y_1, z_1))$, and $a_z (x_h, y_h, z_h, d_z (x_1, y_1, z_1))$ in the equation (3). Their bit width is determined depending on the required accuracies for the multipliers and adders that are located in the subsequent stages.

The interpolation multipliers $6_1$ to $6_3$ multiply the interpolation sensitivity signals by the input color signals L*, a*, and b*, respectively, thereby producing plural interpolation data corresponding to $c(b_x (x_h, y_h, z_h, d_x (x_1, y_1, z_1)), x_1)$, $c(b_y (x_h, y_h, z_h, d_y (x_1, y_1, z_1)), y_1)$, $c(b_z (x_h, y_h, z_h, d_z (x_1, y_1, z_1)), z_1)$ in the equation (3). Their bit width is determined depending on the required accuracies for the multipliers and adders that are located in the subsequent stages.

Finally, the interpolation adders $3_1$ to $3_6$ add the interpolation reference values and the interpolation data, respectively, thereby producing the interpolated values.

The color signal transforming apparatus according to the first embodiment of the present invention includes the interpolation region select signal output memory 7 and the interpolation sensitivity signal output memories $5_1$ to $5_3$ so that the hexahedron of an object to be interpolated is divided into six tetrahedrons each passing through one of eight lattice points constituting the hexahedron of the interpolated object, and the different combinations of interpolation data are assigned to the tetrahedrons in one-to-one correspondence manner. With provision of those memories, there is no need for the complicated address conversion which is required when the reference values are read out of the color correction memory. Accordingly, the first embodiment can realize the color signal transforming apparatus that is simple in construction and operable at high speed. Further, the regular arrangement of data in the color correction memory is not essential in the color signal transforming apparatus of the first embodiment. Therefore, the color signal transforming apparatus accepts use of the technique to remove the memory portion out of the color reproduction range by removing the regularity in the data arrangement as disclosed in Published Unexamined Japanese Patent Application Nos. Hei. 2-73779 and 2-187374. Additionally, the continuity at the boundary between the adjacent interpolation regions can be secured.

Furthermore, the interpolation region select signal output memory 7, the interpolation sensitivity signal output memories $5_1$ to $5_3$, and the like may be constructed with lookup table memories. With the feature, the number of required calculations on the output data can be reduced, resulting in realizing the color signal transforming apparatus that is simple in construction and operable at high speed.

Figure 4:
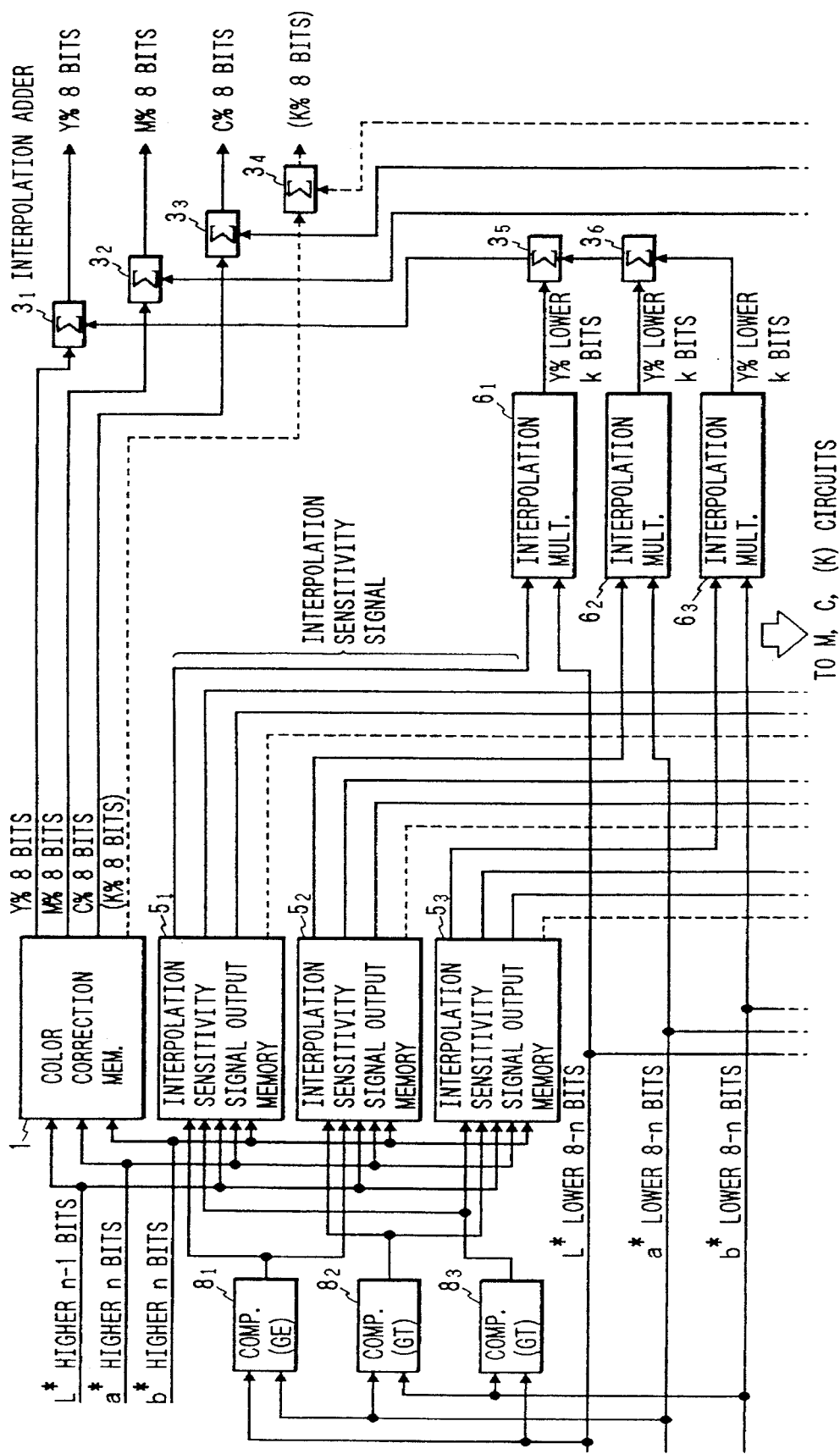
FIG. 4 is a block diagram showing a color signal transforming circuit according to a second embodiment of the present invention.

The arrangement of a second embodiment of the invention is illustrated in FIG. 4.

In the second embodiment, a plurality of comparators $8_1$ to $8_3$ are used in place of the interpolation region select signal output memory 7 that is used in the first embodiment. Those comparators are for comparing the lower bits of the input color signals L*, a*, and b*. The remaining arrangement is substantially the same as that of the first embodiment. The second embodiment using the comparators is advantageous where the number of the lower bits is increased. In such a case, a large memory must be used for the interpolation region select signal output memory 7 in the first embodiment.

The comparators $8_1$ to $8_3$ are constructed in connection with the dividing method of FIG. 1 and Table 1, and in consideration with the operation at the boundaries. Accordingly, one comparator $8_1$ contains the equal sign, while the remaining ones $8_2$ to $8_3$ do not contain it.

Where the numbers of the lower bits of the input signals are different, these are ordered in their places by shift registers before input to the comparators.

Figure 2:
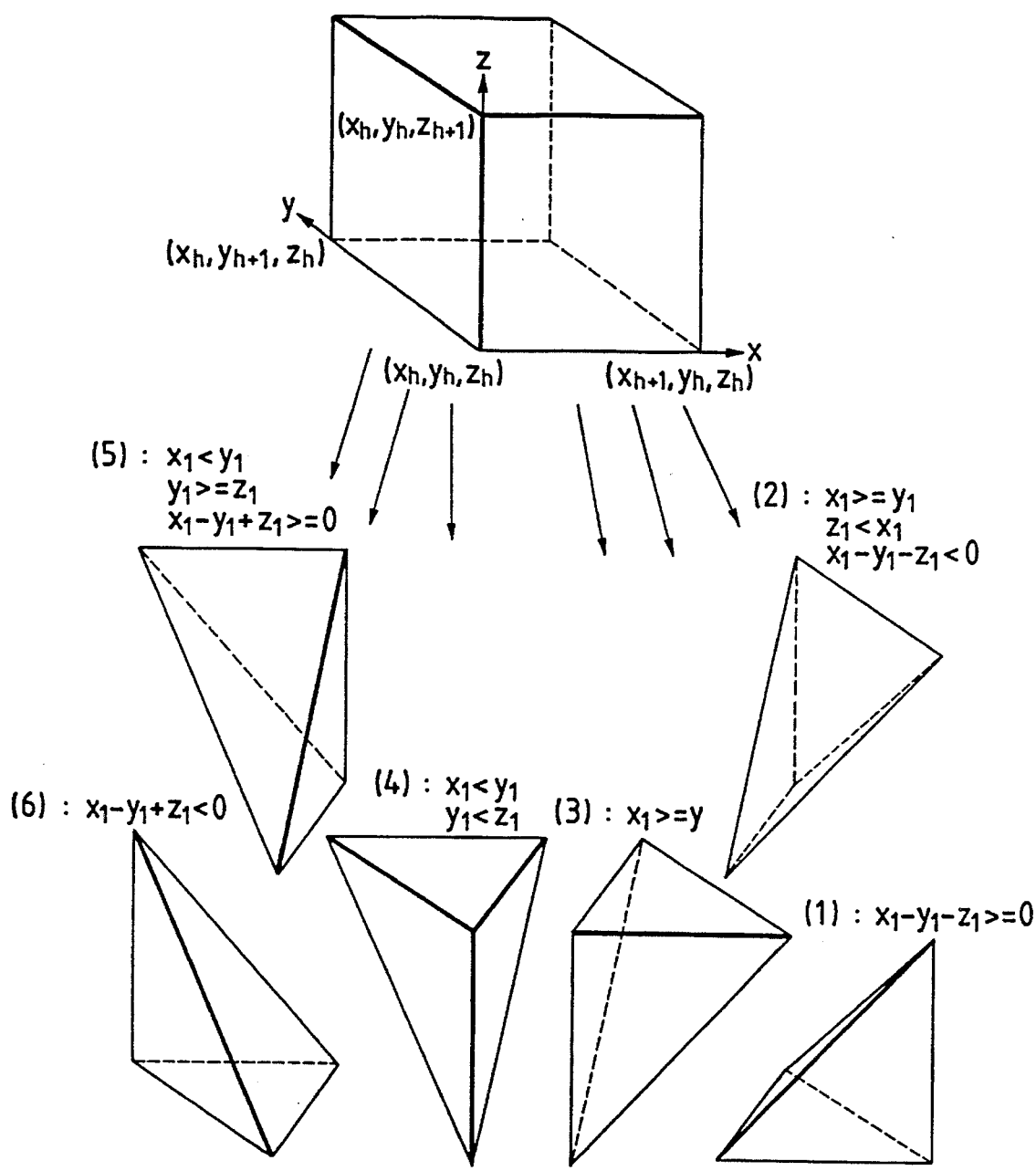
FIG. 2 is an explanatory diagram showing a second method for dividing a unit hexadron according to the present invention.

When the instant embodiment is arranged for the dividing method of FIG. 2 and Table 2, the combination of the comparators 8 is modified so as to generate the interpolation sensitivity select signals shown in Table 2, with a proper combination of adder/subtractors, and comparators for the lower bits of the input signals L*, a*, and b* or some of the lower bits of the three input signals that are shifted.

Figure 5:
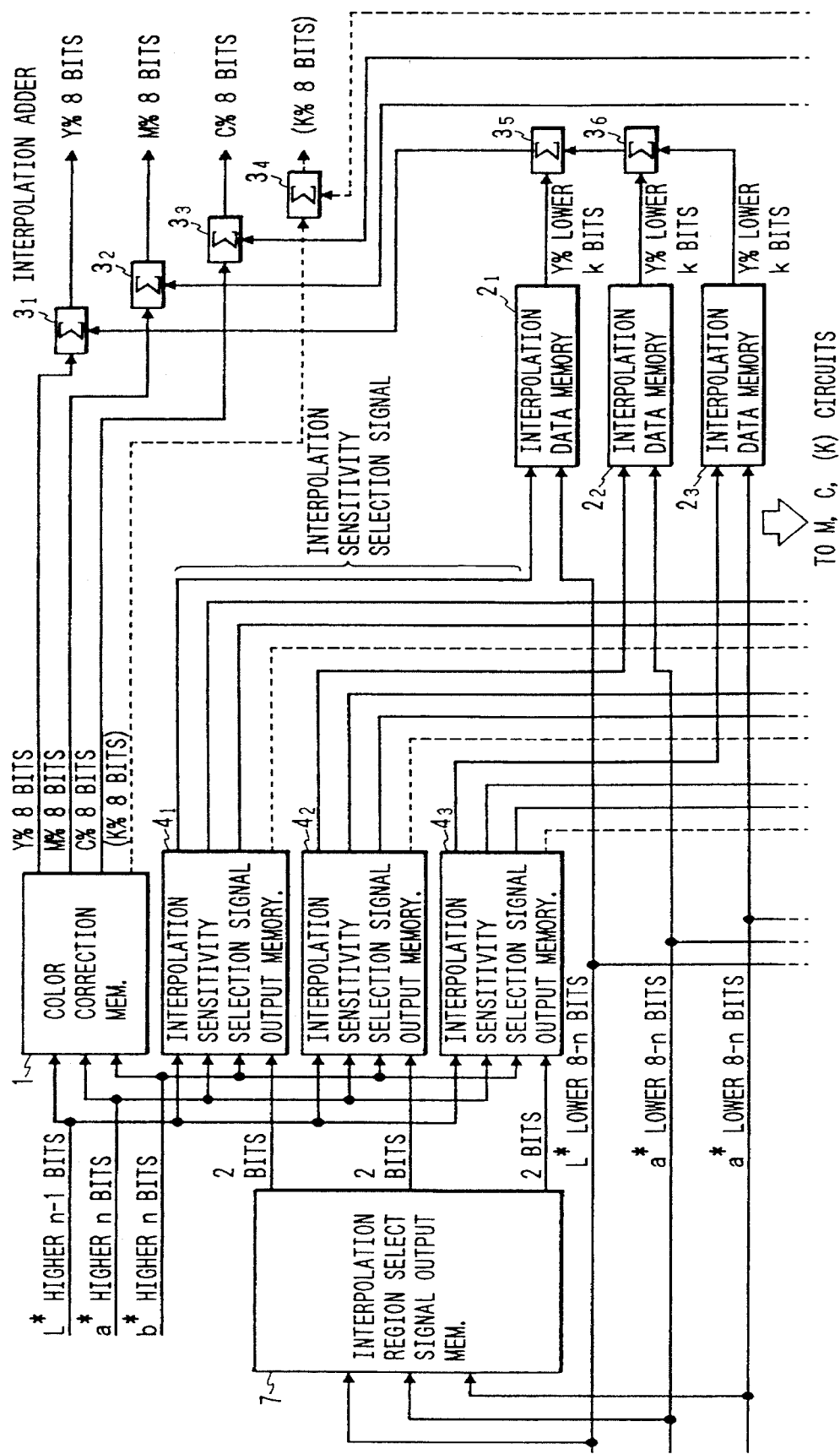
FIG. 5 is a block diagram showing a color signal transforming circuit according to a third embodiment of the present invention.

FIG. 5 is a block diagram showing the arrangement of a third embodiment of the present invention.

In the third embodiment, interpolation sensitivity select signal output memories $4_1$ to $4_3$ and interpolation data memories $2_1$ to $2_3$ are used in place of the interpolation sensitivity signal output memories 5 and the interpolation multipliers 6.

In this embodiment, the multiplying operation is substituted by the memories. Instead of the interpolation sensitivity, the interpolation sensitivity select signals are used for addressing the memories storing the interpolation sensitivity data.

The interpolation data memories $2_1$ to $2_3$ are lookup table memories that are addressed by the output signals of the corresponding interpolation sensitivity select signal output memories $4_1$ to $4_3$, and the lower bits of the corresponding input signals. In response to the address signal, each interpolation data memory produces interpolation data corresponding to $c(b_x (x_h, y_h, z_h, d_x (x_1, y_1, z_1)), x_1)$, $c(b_y (x_h, y_h, z_h, d_y (x_1, y_1, z_1)), y_1)$, $c(b_z (x_h, y_h, z_h, d_z (x_1, y_1, z_1)), z_1)$ in the equation (3). Their bit width is determined depending on the required accuracies for the adders that are located in the subsequent stage.

The interpolation sensitivity select signal output memories $4_1$ to $4_3$ are lookup table memories which produce interpolation sensitivity select signals corresponding to $b_x (x_h, y_h, z_h, d_x (x_1, y_1, z_1))$, $b_y (x_h, y_h, z_h, d_y (x_1, y_1, z_1))$, $b_z (x_h, y_h, z_h, d_z (x_1, y_1, z_1))$, when the higher bits of the input signals L*, a*, and b*, and some of the interpolation region select signals form address signals to the interpolation sensitivity select signal output memories $4_1$ to $4_3$, and then receiving the address signals. In the instant embodiment, since the lookup table memories are used for the interpolation data memories $2_1$ to $2_3$, in place of the multipliers. The signals output from the interpolation sensitivity select signal output memories $4_1$ to $4_3$ are not the interpolation sensitivity signals, but address signals to the memories storing the interpolation data representative of the corresponding interpolation sensitivity signals.

Their bit width depends on what number of different interpolation sensitivity signals are required for the whole color space of the input color signals. The entire circuit scale of the instant embodiment is smaller than that of the first embodiment when the higher bits are increased and the lower bits are decreased.

Figure 6:
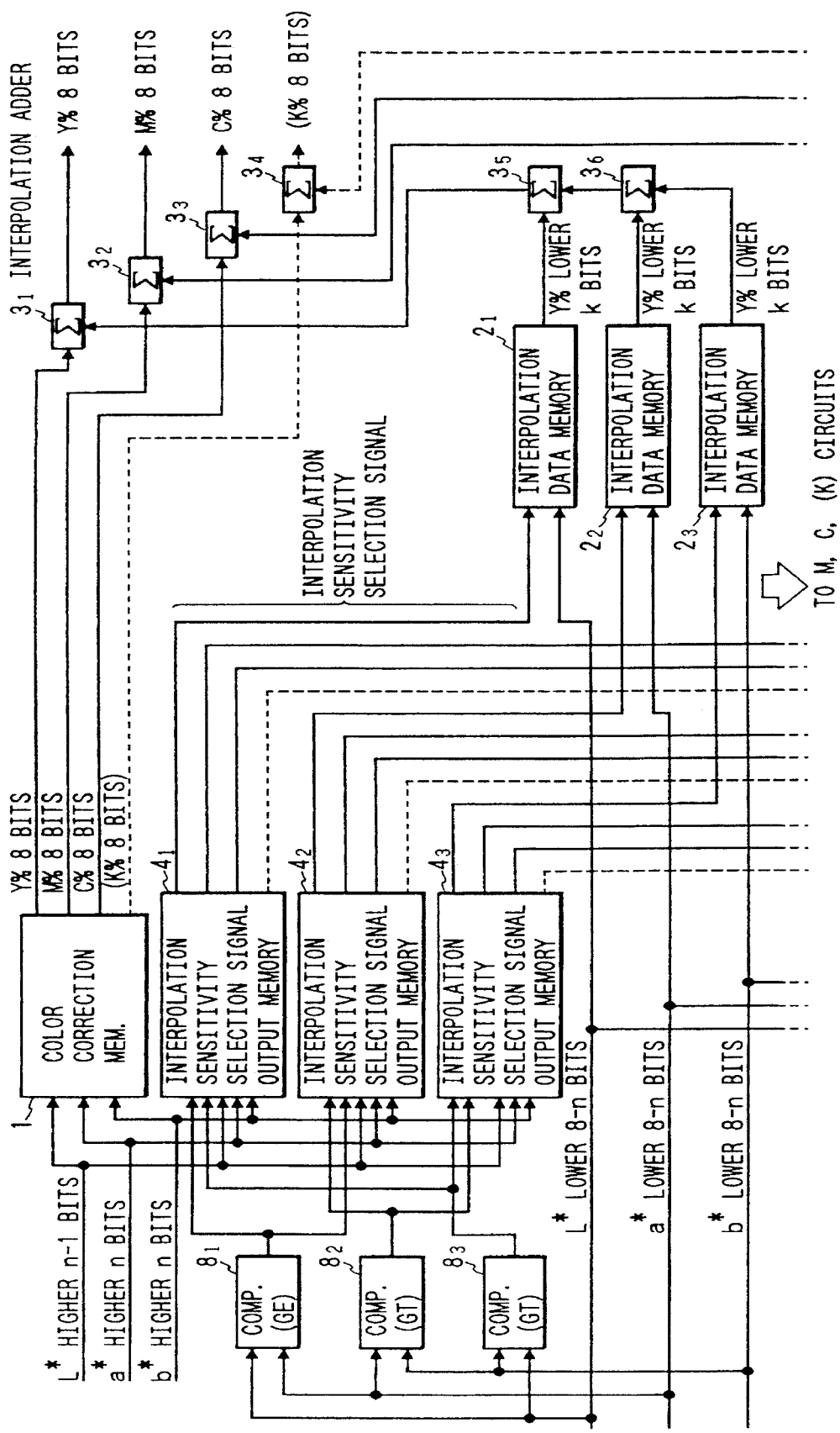
FIG. 6 is a block diagram showing a color signal transforming circuit according to a fourth embodiment of the present invention.

FIG. 6 is a block diagram showing the arrangement of a fourth embodiment of the present invention. In the fourth embodiment, the interpolation region select signal output memory 7 in the third embodiment is substituted by comparators $8_1$ to $8_3$ which are for comparing the lower bits of the input color signals L*, a*, and b*. For the description on the comparators $8_1$ to $8_3$, reference is made to the corresponding portion in the second embodiment.

Figure 7:
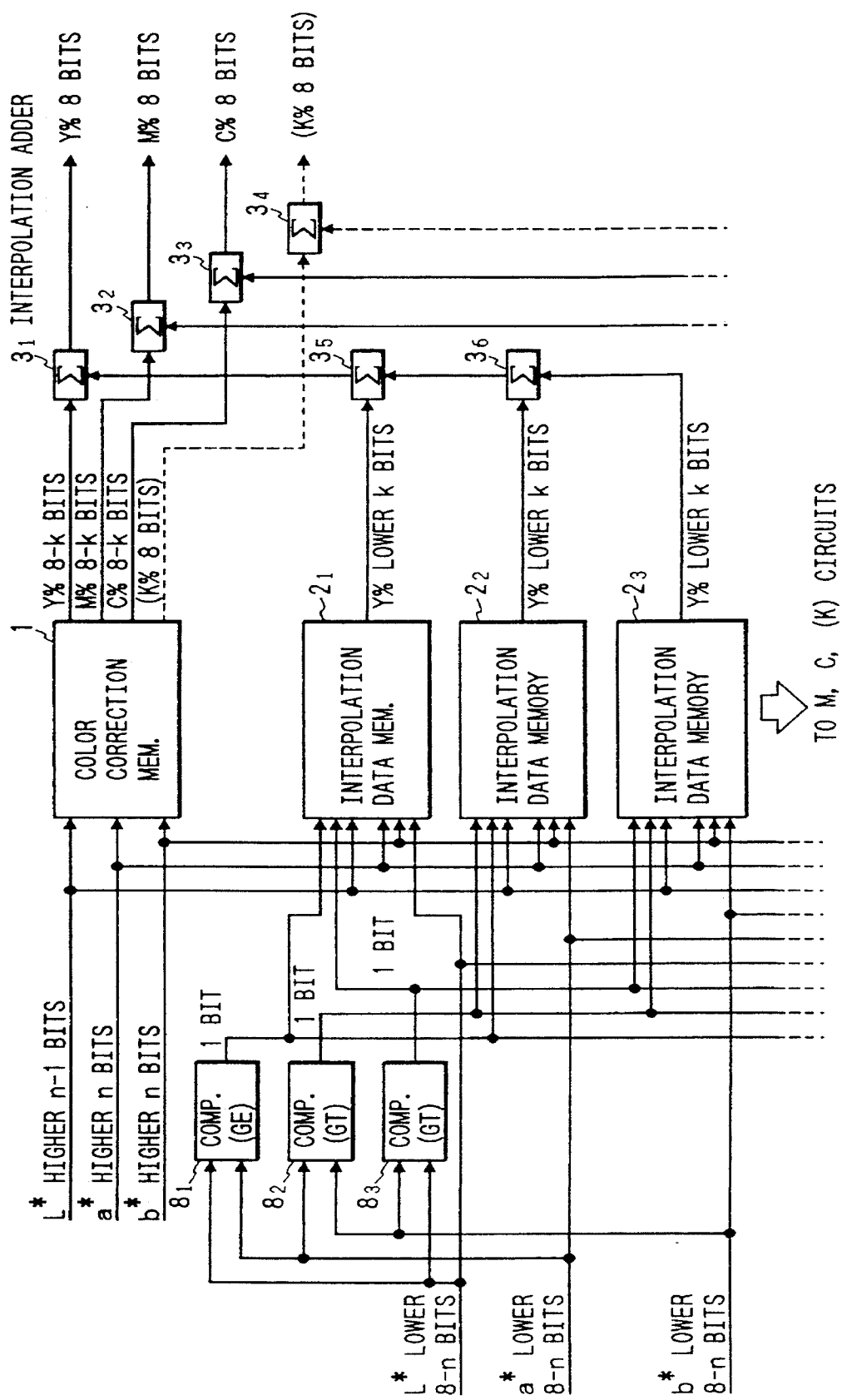
FIG. 7 is a block diagram showing a color signal transforming circuit according to a fifth embodiment of the present invention.
Figure 8:
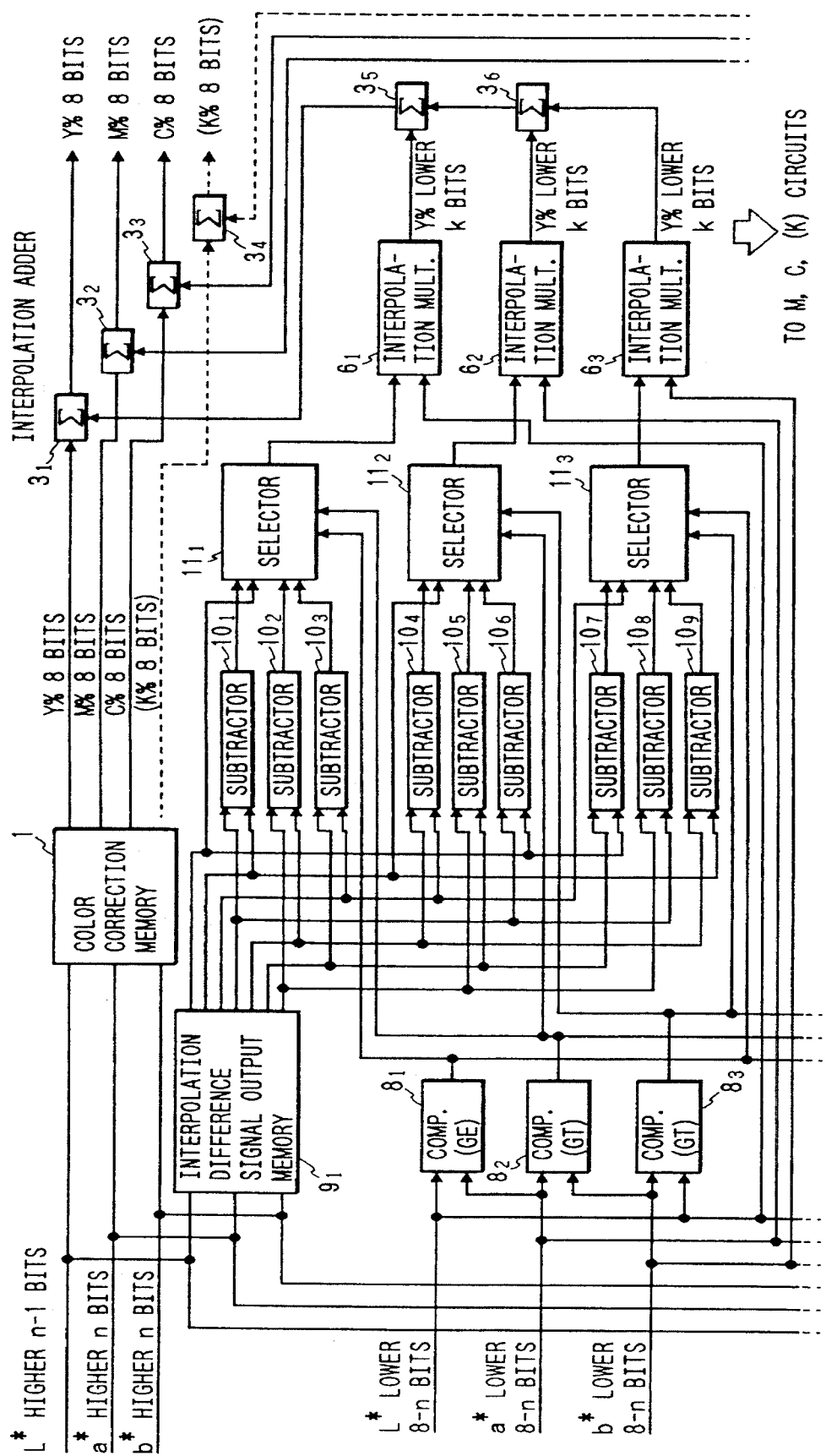
FIG. 8 is a block diagram showing a color signal transforming circuit according to a sixth embodiment of the present invention.

FIG. 7 is a block diagram showing the arrangement of a fifth embodiment of the present invention. The fifth embodiment is substantially equal to the third embodiment except that the interpolation sensitivity select signal output memories 4 are omitted, and the interpolation data memories $2_1$ to $2_3$ have also the functions of these memories 4.

The higher bits of the input signals L*, a*, and b* and some of the interpolation region select signals, one of the lower bits of the input signals L*, a*, and b* cooperate to form an address signal to each of the interpolation data memories $2_1$ to $2_3$ as lookup table memories. Their output bit width is determined by the required accuracies of the adders. Comparison of the fifth embodiment with the fourth embodiment is as follows. When the number of the higher bits is small, the total memory capacity of those memories in the fifth embodiment is smaller than that in the fourth embodiment. When the number of the higher bits is large, the total memory capacity of those memories in the fifth embodiment is larger than that in the fourth embodiment.

The reason for this follows. When the number of the higher bits is small, the number of input addresses to the interpolation data memories is independent of the output bit width. When the number of the higher bits is large, a plurality of interpolation regions have frequently equal interpolation intensities. Accordingly, in the fourth embodiment, the memory can be saved by the amount of the memory storing the equal interpolation intensities.

Figure 9:
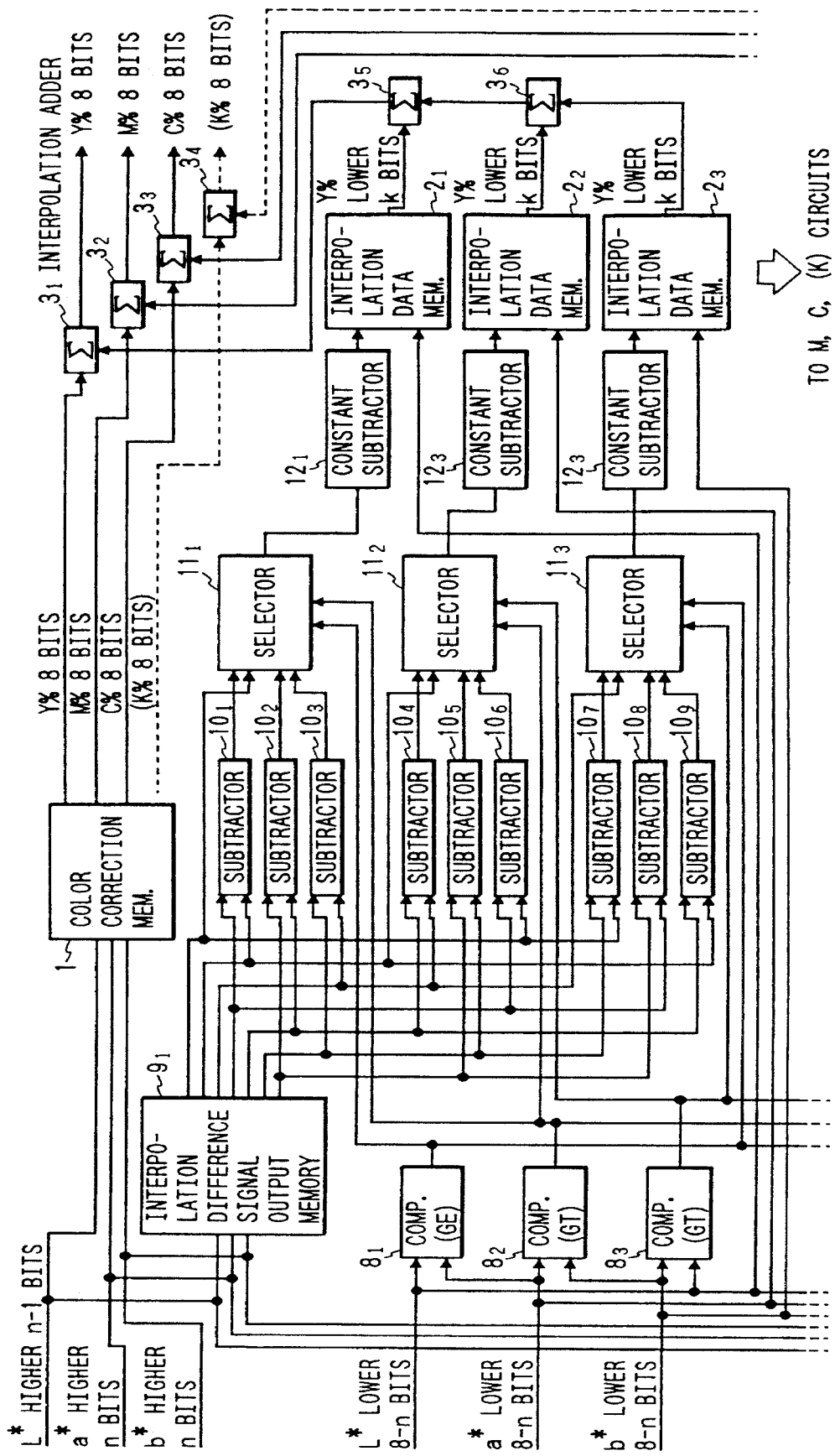
FIG. 9 is a block diagram showing a color signal transforming circuit according to a seventh embodiment of the present invention.

FIG. 9 is a block diagram showing the arrangement of a sixth embodiment of the present invention.

The sixth embodiment is substantially equal to the second embodiment except that the interpolation sensitivity signal output memories 5 are substituted by interpolation sensitivity signal output means made up of an interpolation difference signal output memory $9_1$, a plurality of subtractors $10_1$ to $10_9$, and a plurality of selectors $11_1$ to $11_3$.

The combination of the interpolation sensitivity signal output means is provided for the dividing method of FIG. 1 and Table 1. When the memory capacity of the interpolation sensitivity signal output memories is compared with that of the interpolation difference signal output memory $9_1$, 12:7 when the numbers of the upper order bits of the input signals are equal to one another. Therefore, as the number of the higher bits is increased, the sixth embodiment is more effectively operable.

The interpolation difference signal output memory $9_1$ is a lookup table memory which receives the higher bits of the input signals L*, a*, and b* as an address signal. In response to the address signal, the memory produces difference data corresponding to $e_{i,i=1,7}$ ($x_h$, $y_h$, $z_h$) in the equation (3), and to seven lattice points as the remaining lattice points when one of the eight lattice points of each of the hexadrons of the interpolated regions is a reference point. The output signals of the output memory $9_1$ are applied to the subtractors $10_1$ to $10_9$ which form a plurality of interpolation sensitivity output signals. These interpolation sensitivity output signals correspond to $a_x$ ($e_{i,i=1,7}$ ($x_h$, $y_h$, $z_h$), $d_x$ ($x_1$, $y_1$, $z_1$)), $a_y$ ($e_{i,i=1,7}$ ($x_h$, $y_h$, $z_h$), $d_y$ ($x_1$, $y_1$, $z_1$)), and $a_z$ ($e_{i,i=1,7}$ ($x_h$, $y_h$, $z_h$), $d_z$ ($x_1$, $y_1$, $z_1$)) in the equation (3).

The interpolation sensitivity output signals are applied to the selectors $11_1$ to $11_3$. In response to interpolation region select signals, the selectors $11_1$ to $11_3$ select the interpolation sensitivity output signals of the corresponding interpolation regions, respectively.

When the sixth embodiment is arranged for the dividing method of FIG. 2 and Table 2, the combination of the comparators $8_1$ to $8_3$ is modified so as to generate the interpolation sensitivity select signals shown in Table 2, with a proper combination of adder/subtractors, and comparators for the lower bits of the input signals L*, a*, and b* or some of the lower bits of the three input signals that are shifted. Further, a plurality of adder/subtractors are used in place of the subtractors 10, whereby to generate the interpolation sensitivity signals shown in Table 2.

It is evident to those skilled in the art that in the sixth embodiment, the interpolation region select signal output memory may be used in place of the comparators $8_1$ to $8_3$, although not illustrated.

FIG. 9 is a block diagram showing the arrangement of a sixth embodiment of the present invention.

The seventh embodiment is substantially equal to the third embodiment except that the interpolation sensitivity signal output memories 5 are substituted by interpolation sensitivity signal output means made up of an interpolation difference signal output memory 9, a plurality of subtractors $10_1$ to $10_9$, a plurality of selectors $11_1$ to $11_3$, and a plurality of constant subtractors $12_1$ to $12_3$.

The interpolation sensitivity signal output means of the seventh embodiment is different from that of the sixth embodiment in that the former has the plurality of constant subtractors $12_1$ to $12_3$. In the seventh embodiment, the lookup table memories are used in place of the multipliers in the sixth embodiment. Accordingly, the output signals of the selectors are not the interpolation sensitivity signals, but address signals to address the lookup table memories storing the interpolation data corresponding to the interpolation sensitivity signals. To this end, the constant subtractors are provided to transform the interpolation sensitivity signals to the interpolation sensitivity select signals.

The arrangement and functions of other circuit components than the constant subtractors are substantially the same as those of the third or seventh embodiment.

Figure 10:
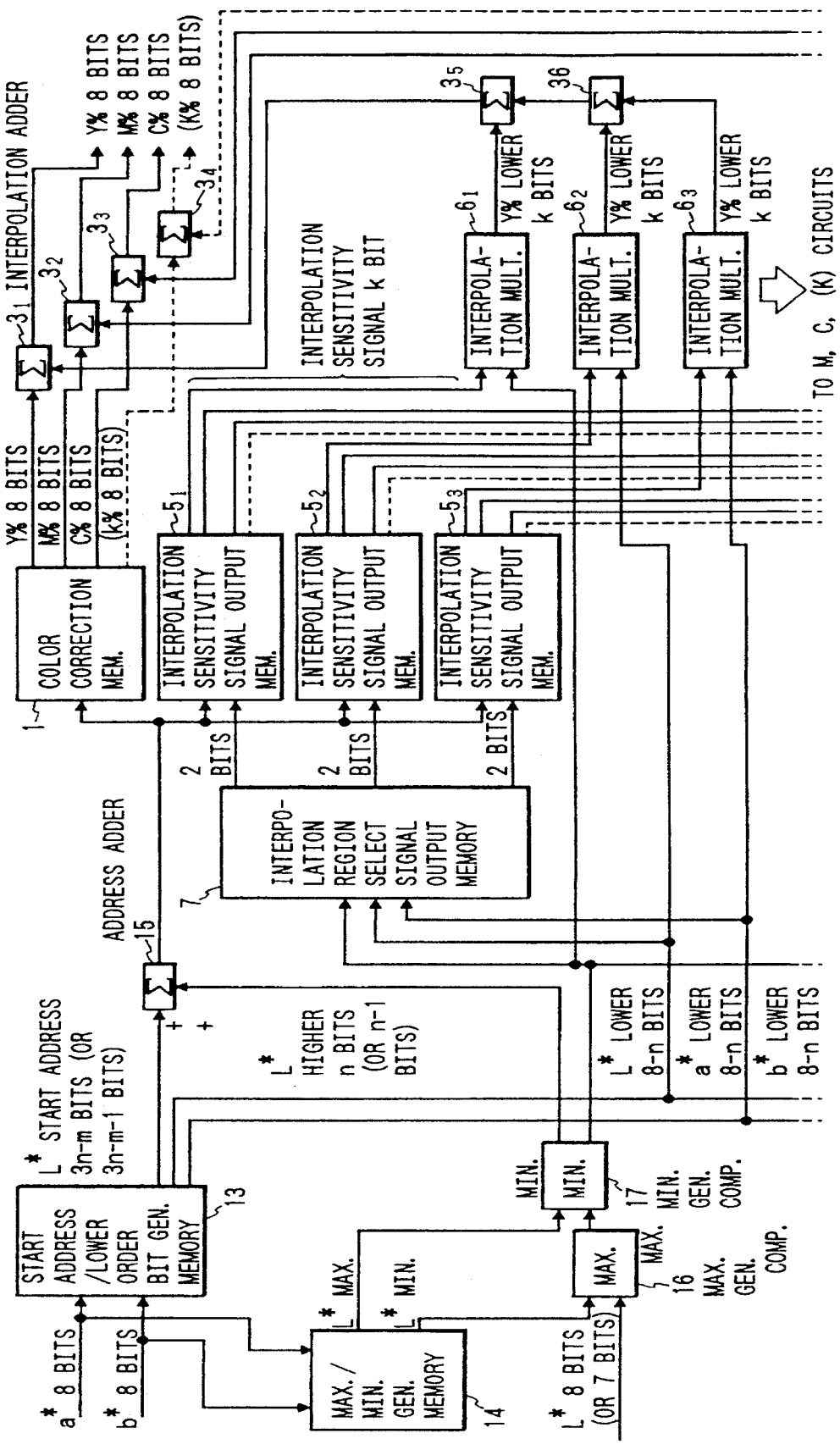
FIG. 10 is a block diagram showing a color signal transforming circuit according to an eighth embodiment of the present invention.
Figure 11:
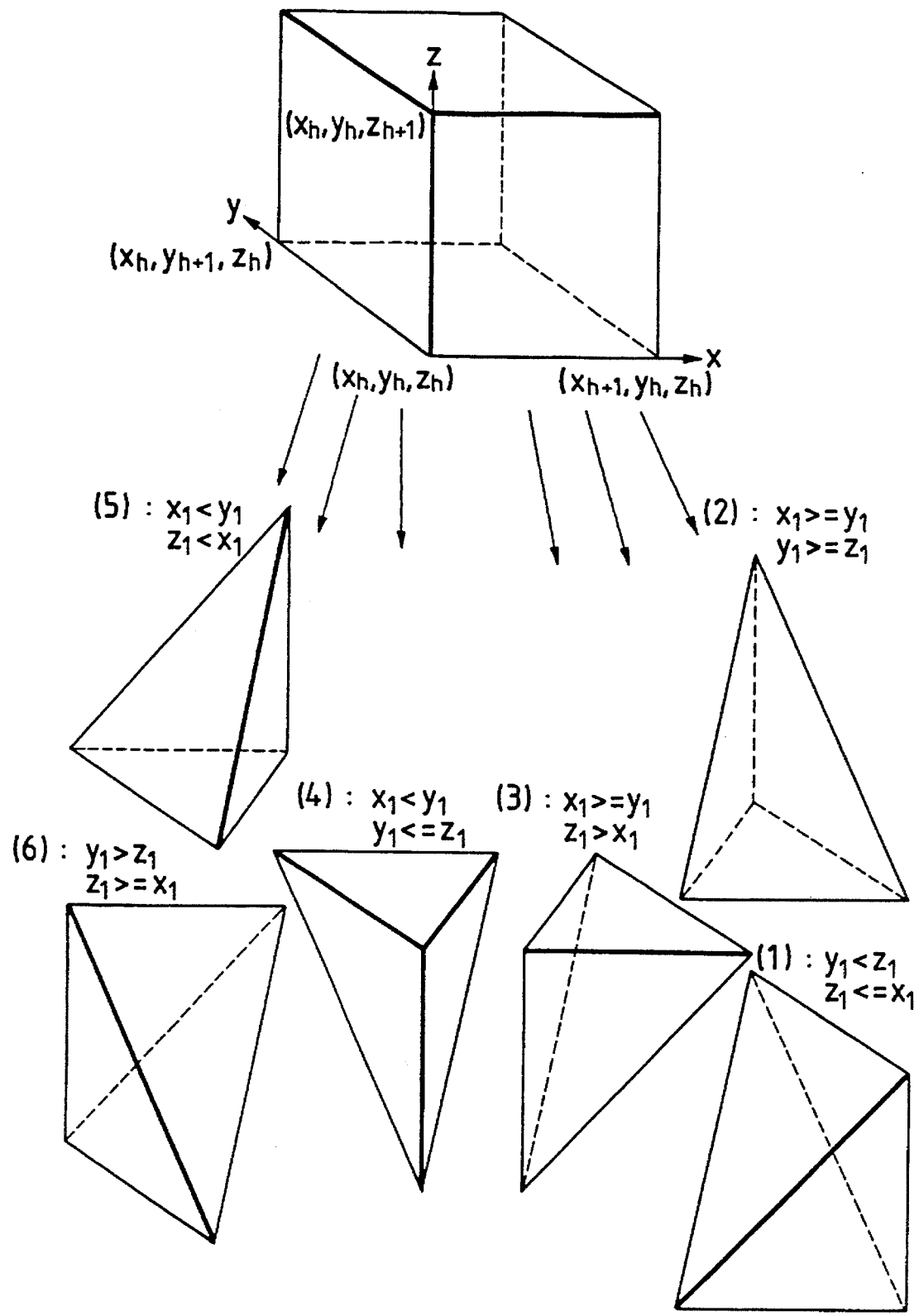
FIG. 11 is an explanatory diagram showing a conventional method for dividing a unit hexadron.
Figure 12:
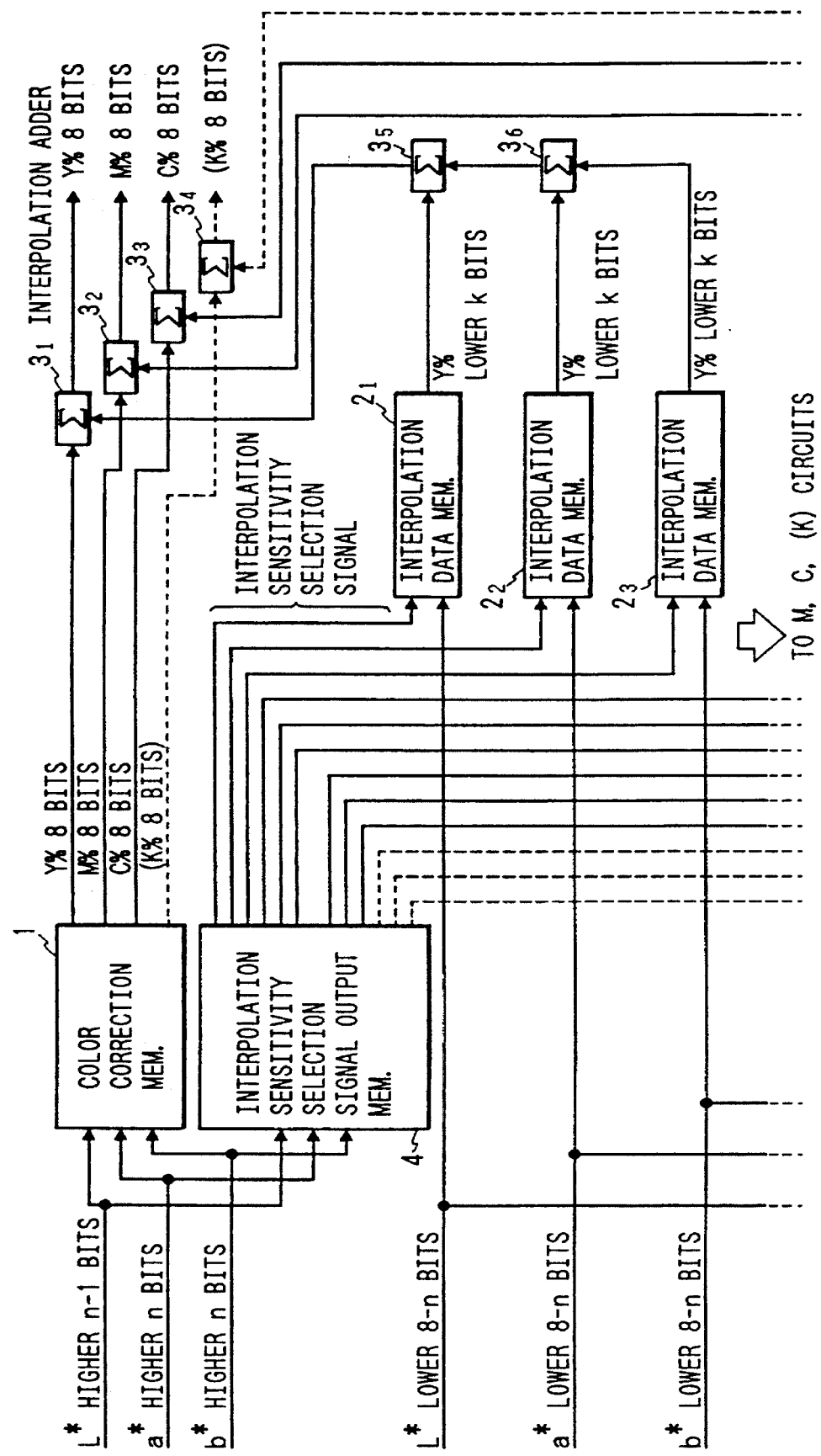
FIG. 12 is a diagram showing a conventional interpolation circuit.
Figure 13:
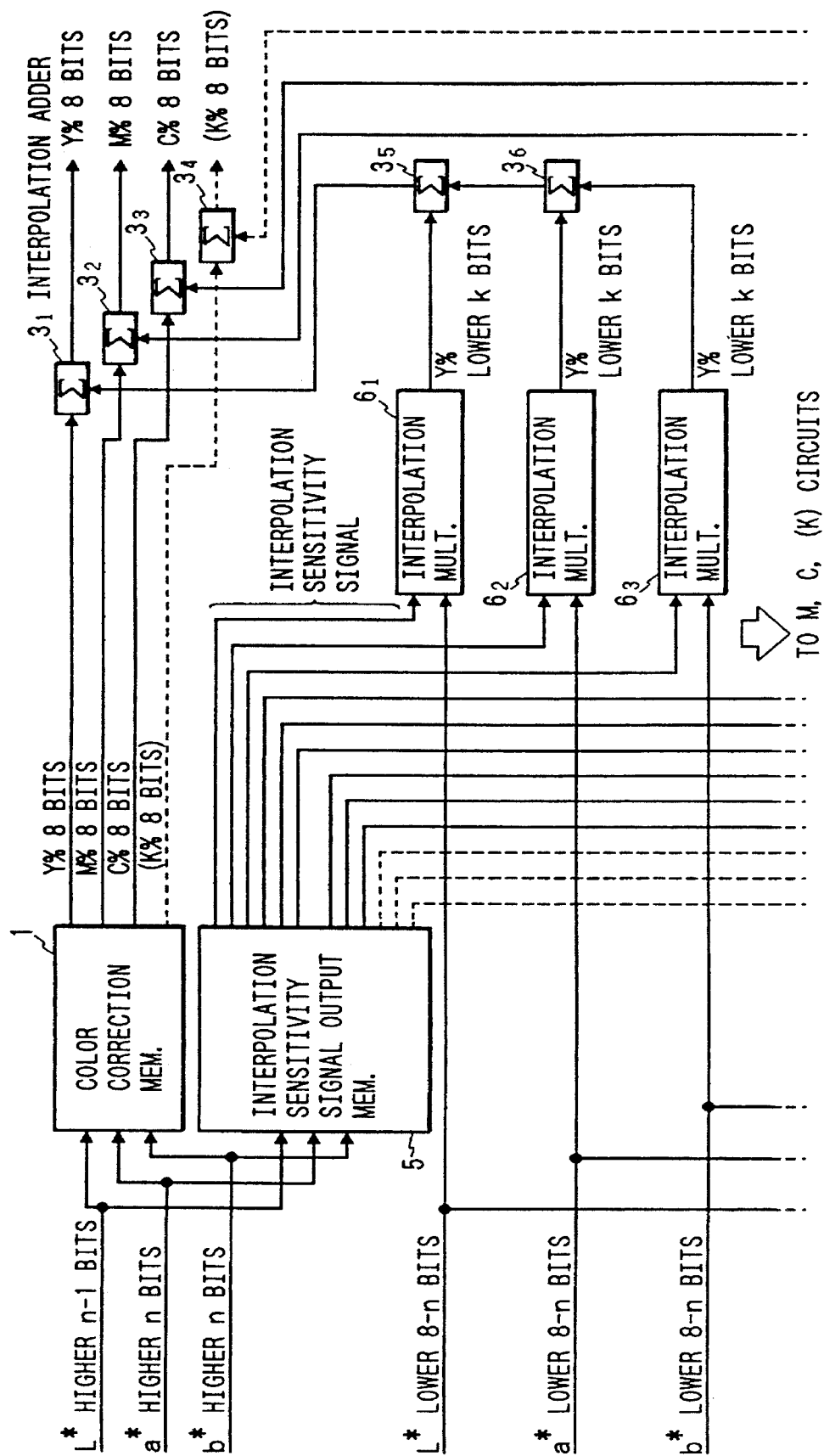
FIG. 13 is a diagram showing another conventional interpolation circuit.

FIG. 10 is a block diagram showing the arrangement of an eighth embodiment of the present invention.

The embodiment of FIG. 10 is the combination of the first embodiment and the technique to remove the memory portion out of the color reproduction range of the output by irregularly rearranging the data that are regularly arranged (Published Unexamined Japanese Patent Application No. Hei. 2-187374). As a matter of course, it may be combined with another embodiment of the present invention.

As seen, the arrangement of the first embodiment follows the combination of an upper/lower bits generating memory 13, a maximum/minimum generating memory 14, an address adder 15, a maximum generator/comparator 16, and a minimum generator/comparator 17.

The outline of the additional combination will be described, and for details of it, reference is made to Published Unexamined Japanese Patent Application No. Hei. 2-187374.

The upper/lower bits generating memory 13 sets the input signals a* and b* out of the color reproduction range of the output within the color reproduction range of the output, with the same hue. And the memory produces a start address of the input signal L* and the lower bits of the input signals a* and b* after being set within the color reproduction range of the output.

The maximum/minimum generating memory 14 produces the maximum and minimum values of the signal L* corresponding to the input signals a* and b*. With the circuit arrangement including the memory, the maximum generator/comparator 16 and the minimum generator/comparator 17, the output signals of the memory 14 undergoes comparison with the input signal L*. When the input signal L* is out of the color reproduction range of the output, the combination sets it within the output color reproduction range.

The address adder 15 adds the start address of the signal L* and a value of the higher bits of the signal L* that is set within the color reproduction range of the output. As a result, it produces a new address of the basic data color correction memory 1 and the interpolation sensitivity signal output memories 4.

With cooperation of the start address of the signal L* and the address adder, it is possible to remove the portion of the interpolation sensitivity signal output memories 4 which corresponds to the input signals out of the color reproduction range of the output. Therefore, the memory capacities of the color correction memory 1 and interpolation sensitivity signal output memories 4 can be reduced.

In a method of transforming color signals according to the present invention, the hexahedron of an object to be interpolated is divided into six tetrahedrons each passing through one of eight lattice points constituting the hexahedron of the interpolated object, and the different combinations of interpolation data are assigned to the tetrahedrons in one-to-one correspondence manner. Accordingly, there is no need for the complicated address conversion which is required when the reference values are read out of the color correction memory. Accordingly, the color signal transforming method provides a high speed processing. Further, the regular arrangement of data in the color correction memory is not essential in the color signal transforming apparatus of the first embodiment. Therefore, the color signal transforming apparatus accepts use of the technique to remove the memory out of the color reproduction range by irregularly rearranging the data that are regularly arranged in the color correction memory. Additionally, the continuity at the boundary between the adjacent interpolation regions can be secured.

A color signal transforming apparatus of the present invention includes means, i.e., interpolation sensitivity output memory means, interpolation sensitivity select output memory means, interpolation sensitivity output means, interpolation sensitivity select output means, or interpolation data output memory means, so that the hexahedron of an object to be interpolated is divided into six tetrahedrons each passing through one of eight lattice points constituting the hexahedron of the interpolated object, and the different combinations of interpolation data are assigned to the tetrahedrons in one-to-one correspondence manner. With provision of the memories, there is no need for the complicated address conversion which is required when the reference values are read out of the color correction memory. Accordingly, the first embodiment can realize the color signal transforming apparatus that is simple in construction and operable at high speed. Further, the regular arrangement of data in the color correction memory is not essential in the color signal transforming apparatus. Therefore, the color signal transforming apparatus accepts use of the technique to remove the memory out of the color reproduction range by irregularly rearranging the regularly arranged data as disclosed in Published Unexamined Japanese Patent Application Nos. Hei. 2-73779 and 2-187374. Additionally, the continuity at the boundary between the adjacent interpolation regions can be secured.

The color signal transforming apparatus of the present invention is provided with interpolation region select memory means or interpolation region select signal output means and interpolation data output means or interpolation data output memory means. With provision of the memories, the number of required calculations on the output data can be reduced, and the apparatus is operable at high speed, with a simple circuit construction. Further, in connection with those, the handling of data at the boundaries at the time of division/interpolation is strictly defined. Accordingly, unnecessary comparisons for magnitude decision can be reduced.

The present invention may includes a memory, which produces difference data corresponding to seven lattice points as the remaining lattice points when one of the eight lattice points of each of the hexadrons of the interpolated regions is a reference point. Use of such a memory provides an interpolation method enjoying the above-mentioned effects with the memory capacity as small as possible, although the number of calculations is slightly increased.

What is claimed is:

1. A method for transforming color signals comprising the steps of dividing each of three input signals representative of colors into higher bits and lower bits, combining the higher bits to form basic data, combining the higher and lower bits to form interpolation data, and adding the basic data and the interpolation data to each other to thereby produce output signals, in which the hexahedron of an object to be interpolated is divided into six tetrahedrons each passing through one of eight lattice points constituting the hexahedron of the interpolated object, and the different sets of interpolation data are assigned to the tetrahedrons in one-to-one correspondence manner.

2. An apparatus for transforming color signals having three input signals representative of colors being each divided into the lower bits and the higher bits which are combined to form address signals, and said apparatus comprising a color correction memory, when receiving the address signals, for producing basic data, interpolation data generating means for generating the combinations of interpolation data in accordance with the combinations of the higher bits and the lower bits, and adder means for adding the output signal of the color correction memory and the output signal of the interpolation data generating means, to thereby produce an output signal, wherein said interpolation data generating means includes means for dividing the hexahedron of an object to be interpolated into six tetrahedrons each passing through one of eight lattice points constituting the hexahedron of the interpolated object, and for assigning the different sets of interpolation data to the tetrahedrons in one-to-one correspondence manner.

3. A color signal transforming apparatus having three input signals representative of colors being each divided into lower bits and higher bits which are combined to form address signals, and said apparatus comprising a color correction memory, when receiving the address signals, for producing basic data, interpolation data generating means for generating combinations of interpolation data in accordance with combinations of the higher bits and the lower bits, and adder means for adding an output signal of the color correction memory and an output signal of the interpolation data generating means, to thereby produce an output signal, wherein said interpolation data generating means includes means for dividing a hexahedron of an object to be interpolated into six tetrahedrons each passing though one of eight lattice points constituting the hexahedron of the interpolated object, and for assigning different combinations of interpolation data to the tetrahedrons in one-to-one correspondence manner, wherein said interpolation data generating means comprises interpolation region select memory means for outputting a plurality of interpolation region select signals that are fit to a commonness of interpolation sensitivity signals, with the combination of the lower order bits as an address signal, to specify to which of the six tetrahedrons each said input signal belongs.

4. The color signal transforming apparatus according to claim 3 wherein said interpolation data generating means comprises interpolation sensitivity output memory means for producing a plurality of interpolation sensitivity signals in response to address signals consisting of the combination of the higher bits of the three input color signals and some of the interpolation region select signals, and a plurality of interpolation data calculating means for producing interpolation data by multiplying one of the output signals of said interpolation sensitivity output memory means by the lower bit of one of the three input color signals.

5. The color signal transforming apparatus according to claim 3 wherein said interpolation data generating means comprises interpolation sensitivity select output memory means for producing a plurality of interpolation sensitivity signals in response to address signals consisting of the combination of the higher bits of the three input color signals and some of the interpolation region select signals, and a plurality of interpolation data output memory means for producing interpolation data in response to an address signal including one of the output signals of said interpolation sensitivity select output memory means and the lower bit of one of the three input color signals.

6. The color signal transforming apparatus according to claim 3 wherein said interpolation data generating means comprises a plurality of interpolation data output memory means for producing interpolation data in response to address signals consisting of the combination of the higher bits of the three input color signals and some of the interpolation region select signals, and the lower bit of one of the three input color signals.

7. The color signal transforming apparatus according to claim 3 wherein said interpolation data generating means comprises interpolation sensitivity output means containing a memory portion for producing difference data corresponding to seven lattice points as the remaining lattice points when one of the eight lattice points of each of the hexadrons of the interpolated regions as the combinations of the higher bits is a reference point in response to an address signal as the combination of the higher bits of the three input color signals, a plurality of subtractor portions for calculating the difference between the difference data, and a portion for selecting a plurality of proper interpolation sensitivity output signals from among the difference data or the subtraction results by using some of the interpolation region select signals; and a plurality of interpolation data output means for outputing output data by multiplying one of the output signals of said interpolation sensitivity output means by the lower bit of one of the three input signals.

8. The color signal transforming apparatus according to claim 3 wherein said interpolation data generating means comprises interpolation sensitivity select output means containing a memory portion for producing difference data corresponding to seven lattice points as the remaining lattice points when one of the eight lattice points of each of the hexadrons of the interpolated regions as the combinations of the higher bits is a reference point in response to an address signal as the combination of the higher bits of the three input color signals, calculating portions for forming interpolation sensitivity select output signals from the difference data, portions for selecting a plurality of proper interpolation sensitivity output signals from among the difference data or the subtraction results by using some of the interpolation region select signals, and portions for transforming the plurality of selected interpolation sensitivity output signals into a plurality of interpolation sensitivity select signals; and a plurality of interpolation data output means for outputting interpolation data in response to an address signal containing one of the output signals of said interpolation sensitivity select output means and the lower bit of one of the three input signals.

9. A color signal transforming apparatus having three input signals representative of colors being each divided into lower bits and higher bits which are combined to form address signals, and said apparatus comprising a color correction memory, when receiving the address signals, for producing basic data, interpolation data generating means for generating combinations of interpolation data in accordance with combinations of the higher bits and the lower bits, and adder means for adding an output signal of the color correction memory and an output signal of the interpolation data generating means, to thereby produce an output signal, wherein said interpolation data generating means includes means for dividing a hexahedron of an object to be interpolated into six tetrahedrons each passing though one of eight lattice points constituting the hexahedron of the interpolated object, and for assigning different combinations of interpolation data to the tetrahedrons in one-to-one correspondence manner, wherein said interpolation data generating means comprises a plurality of comparators for comparing the lower bits of the three input signals, some shifted lower bits of the three input signals, or results of addition/subtraction thereof, and means for producing combinations of output signals of said comparators in the form of a plurality of interpolation region select signals that are fit to a commonness of interpolation sensitivity signals.

10. The color signal transforming apparatus according to claim 9 wherein said interpolation data generating means comprises interpolation sensitivity output memory means for producing a plurality of interpolation sensitivity signals in response to address signals consisting of the combination of the higher bits of the three input color signals and some of the interpolation region select signals, and a plurality of interpolation data calculating means for producing interpolation data by multiplying one of the output signals of said interpolation sensitivity output memory means by the lower bit of one of the three input color signals.

11. The color signal transforming apparatus according to claim 9 wherein said interpolation data generating means comprises interpolation sensitivity select output memory means for producing a plurality of interpolation sensitivity signals in response to address signals consisting of the combination of the higher bits of the three input color signals and some of the interpolation region select signals, and a plurality of interpolation data output memory means for producing interpolation data in response to an address signal including one of the output signals of said interpolation sensitivity select output memory means and the lower bit of one of the three input color signals.

12. The color signal transforming apparatus according to claim 9 wherein said interpolation data generating means comprises a plurality of interpolation data output memory means for producing interpolation data in response to address signals consisting of the combination of the higher bits of the three input color signals and some of the interpolation region select signals, and the lower bit of one of the three input color signals.

13. The color signal transforming apparatus according to claim 9 wherein said interpolation data generating means comprises interpolation sensitivity output means containing a memory portion for producing difference data corresponding to seven lattice points as the remaining lattice points when one of the eight lattice points of each of the hexadrons of the interpolated regions as the combinations of the higher bits is a reference point in response to an address signal as the combination of the higher bits of the three input color signals, a plurality of subtractor portions for calculating the difference between the difference data, and a portion for selecting a plurality of proper interpolation sensitivity output signals from among the difference data or the subtraction results by using some of the interpolation region select signals; and a plurality of interpolation data output means for outputting output data by multiplying one of the output signals of said interpolation sensitivity output means by the lower bit of one of the three input signals.

14. The color signal transforming apparatus according to claim 9 wherein said interpolation data generating means comprises interpolation sensitivity select output means containing a memory portion for producing difference data corresponding to seven lattice points as the remaining lattice points when one of the eight lattice points of each of the hexadrons of the interpolated regions as the combinations of the higher bits is a reference point in response to an address signal as the combination of the higher bits of the three input color signals, calculating portions for forming interpolation sensitivity select output signals from the difference data, portions for selecting a plurality of proper interpolation sensitivity output signals from among the difference data or the subtraction results by using some of the interpolation region select signals, and portions for transforming the plurality of selected interpolation sensitivity output signals into a plurality of interpolation sensitivity select signals; and a plurality of interpolation data output means for outputting interpolation data in response to an address signal containing one of the output signals of said interpolation sensitivity select output means and the lower bit of one of the three input signals.

15. A color signal transforming apparatus comprising:

a start address/lower bit generating memory, when receiving an address signal containing two of three input signals representative of a first colorimetric coordinate, for producing a start address previously set in consideration of a color reproduction range of an output device and the modified lower bits of the two input signals;

maximum/minimum generating means, when receiving an address signal containing two of the three input signals, for generating the maximum and minimum values of the remaining one input signal in consideration of the color reproduction range of the output device;

calculating means for modifying the remaining one input signal using the maximum and minimum values output from said maximum/minimum generating means;

an address adder for adding the start address output from said start address/lower bit generating memory and the higher bit of a fixed number of the remaining one input signal;

a basic data color correction memory for producing basic data signals representative of colors of a second colorimetric coordinate in response to an address signal as the output signal of said address adder;

interpolation data generating means for generating a set of interpolation data on the basis of the combination of the higher bits output from said address adder and the combination of the modified lower bits of said input signals;

adder means for producing output signals representative of colors of the second colorimetric coordinate by adding the output signal of said basic data color correction memory and the output signal of said interpolation data generating means; and said interpolation data generating means including means for dividing the hexahedron of each object to be interpolated into six tetrahedrons each passing through one of eight lattice points constituting the hexahedron of the interpolated object, and for assigning different sets of interpolation data to the tetrahedrons in one-to-one correspondence manner.

\* \* \* \* \*